United States Patent
Takeuchi et al.

(10) Patent No.: US 8,477,682 B2
(45) Date of Patent: Jul. 2, 2013

(54) BASE STATION, TERMINAL AND WIRELESS COMMUNICATION SYSTEM

(75) Inventors: Keisuke Takeuchi, Yokohama (JP);
Rintaro Katayama, Tachikawa (JP);
Tomonori Yamamoto, Kokubunji (JP);
Koki Uwano, Fujisawa (JP)

(73) Assignee: Hitachi, Ltd., Tokyo (JP)

( * ) Notice: Subject to any disclaimer, the term of this patent is extended or adjusted under 35 U.S.C. 154(b) by 288 days.

(21) Appl. No.: 12/850,657

(22) Filed: Aug. 5, 2010

(65) Prior Publication Data

US 2011/0064061 A1    Mar. 17, 2011

(30) Foreign Application Priority Data

Sep. 14, 2009 (JP) .................................. 2009-211617

(51) Int. Cl.
*H04J 3/08* (2006.01)
*H04J 3/16* (2006.01)

(52) U.S. Cl.
USPC .......................................... 370/326; 370/468

(58) Field of Classification Search
USPC .............. 370/278, 280, 282, 294, 326, 328, 370/329, 336–338, 345, 347, 442–444, 468
See application file for complete search history.

(56) References Cited

U.S. PATENT DOCUMENTS

| 4,510,595 | A | * | 4/1985 | Glance et al. | ............. | 370/278 |
| 5,818,825 | A | * | 10/1998 | Corrigan et al. | ............. | 370/329 |
| 6,771,985 | B1 | * | 8/2004 | Iinuma | ............. | 455/561 |
| 7,443,830 | B2 | * | 10/2008 | Engels et al. | ............. | 370/347 |
| 8,009,616 | B2 | * | 8/2011 | Saito | ............. | 370/328 |
| 8,072,929 | B2 | * | 12/2011 | Frederiksen et al. | ............. | 370/329 |
| 2003/0098992 | A1 | * | 5/2003 | Park et al. | ............. | 358/1.15 |
| 2006/0143345 | A1 | * | 6/2006 | Fredriksson | ............. | 710/106 |
| 2008/0205361 | A1 | | 8/2008 | Takeuchi et al. | | |

FOREIGN PATENT DOCUMENTS

JP    2008-211411 A    9/2008

OTHER PUBLICATIONS

3GPP TS 36.211 V8.6.0, 3rd Generation Partnership Project; Technical Specification Group Radio Access Network; Evolved Universal Terristrial Radio Access (E-URTA); Physical Channels and Modulation (Release 8), Mar. 2009.
3GPP TS 36.212 V8.6.0, (Release 8), Mar. 2009.
3GPP TS 36.213 V8.6.0, (Release 8), Mar. 2009.
A. Jalali et al., Data Throughput of CDMA-HDR High Efficiency-High Data Rate Personal Communication Wireless System, Proceedings of Vehicular Technology Conference (VTC), vol. 3, pp. 1854-1858, 2000.

* cited by examiner

*Primary Examiner* — Hong Cho
(74) *Attorney, Agent, or Firm* — Mattingly & Malur, PC

(57) ABSTRACT

Conventionally, different HARQ processes 801 and 802 (subframes T1 and T2) transmit data packets B and D, respectively. One data packet corresponds to one process and is retransmitted as necessary one by one on a process basis, degrading the usage efficiency of frequency and time resources. To solve this problem, downlink data packets B and D, when needed to be retransmitted, are spatially multiplexed in the different HARQ processes 801 and 802. The data packets are simultaneously retransmitted to the same terminal as process 805 (subframe T3).

15 Claims, 30 Drawing Sheets

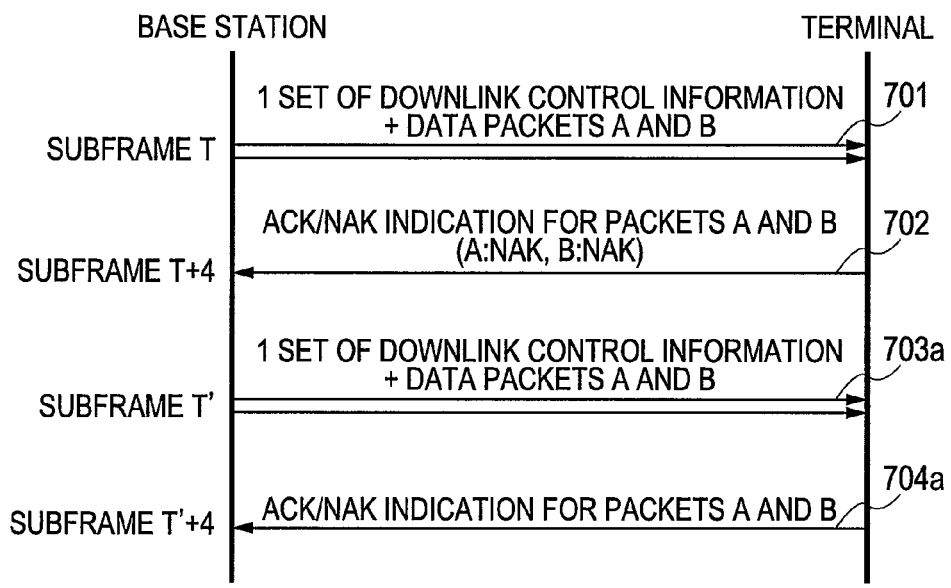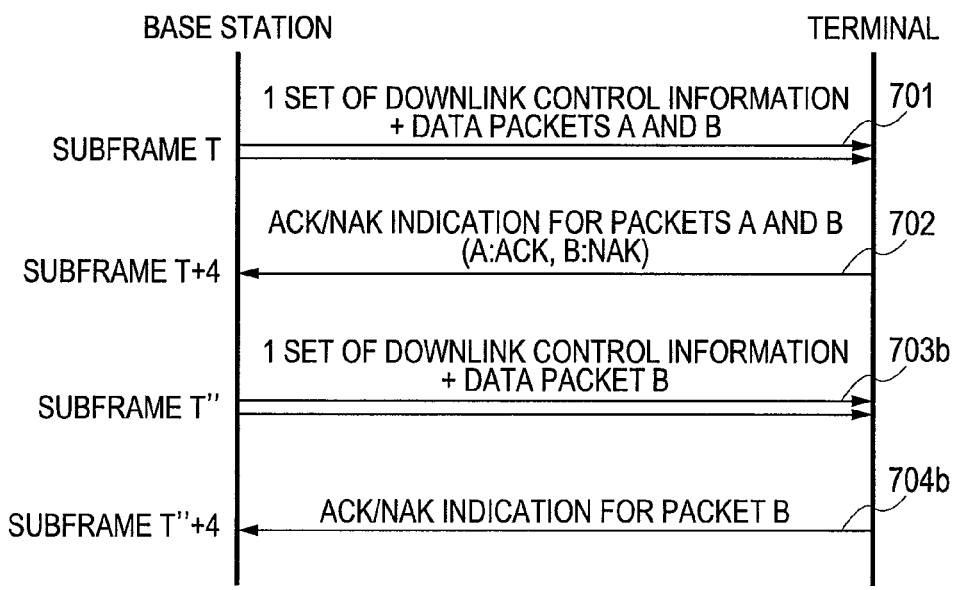

FIG. 9A

RB index=1
Process ID=P1
Swap=0
Packet1:NDI=1,MCS & RV for A
Packet2:NDI=1,MCS & RV for B
PMI=1

FIG. 9B

RB index=1
Process ID=P2
Swap=0
Packet1:NDI=1,MCS & RV for C
Packet2:NDI=1,MCS & RV for D
PMI=1

FIG. 10A

RB index=1
Process ID=P1
Swap=1
Packet1:NDI=0,Dummy MCS & RV
Packet2:NDI=1,MCS & RV for B
PMI=1

FIG. 10B

RB index=1
Process ID=P2
Swap=0
Packet1:NDI=0,Dummy MCS & RV
Packet2:NDI=1,MCS & RV for D
PMI=1

FIG. 22

```
RB index=1
Swap=0
Packet1:Process ID=P2,NDI=1,MCS & RV for C
Packet2:Process ID=P1,NDI=1,MCS & RV for B
PMI=1
```

*FIG. 28A*

RB index=1
Process ID=P1
NDI=1
MCS & RV for A

*FIG. 28B*

RB index=1
Process ID=P2
NDI=1
MCS & RV for B

*FIG. 29A*

RB index=1
Process ID=P1
Swap=0
Packet1:NDI=1,MCS & RV for A
Packet2:NDI=1,Dummy MCS & RV
PMI=1

*FIG. 29B*

RB index=1
Process ID=P2
Swap=0
Packet1:NDI=1,Dummy MCS & RV
Packet2:NDI=1,MCS & RV for B
PMI=1

FIG. 31A

```
RB index=101
Process ID=P1
Swap=1
Packet1:NDI=0,Dummy MCS & RV
Packet2:NDI=1,MCS & RV for B
PMI=1
```

FIG. 31B

```
RB index=101
Process ID=P2
Swap=0
Packet1:NDI=0,Dummy MCS & RV
Packet2:NDI=1,MCS & RV for D
PMI=1
```

FIG. 34A

```
RB index=101
Process ID=P1
Swap=0
Packet1:NDI=1,MCS & RV for A
Packet2:NDI=1,MCS & RV for B
PMI=1
```

FIG. 34B

```
RB index=201
Process ID=P2
Swap=0
Packet1:NDI=1,MCS & RV for C
Packet2:NDI=1,MCS & RV for D
PMI=1
```

BASE STATION, TERMINAL AND WIRELESS COMMUNICATION SYSTEM

CLAIM OF PRIORITY

The present application claims priority from Japanese patent application JP 2009-211617 filed on Sep. 14, 2009, the content of which is hereby incorporated by reference into this application.

FIELD OF THE INVENTION

The present invention relates to a base station, a terminal, and a wireless communication system. More particularly, the invention relates to a cellular wireless communication system and a wireless base station apparatus and a wireless terminal apparatus included in the cellular wireless communication system.

BACKGROUND OF THE INVENTION

Research and development are now progressing on wireless communication systems using OFDM (Orthogonal Frequency Division Multiplexing) for the purpose of high-speed, large-capacity wireless communication. In an OFDM-based system information is transmitted by using multiple orthogonal subcarriers with different frequencies. A transmitting side generates data to be transmitted for the frequency domain, converts the data into a signal for the time domain using IFFT (Inverse Fast Fourier Transform), and transmits a wireless signal. A receiving side converts the signal for the time domain into the signal for the frequency domain using FFT (Fast Fourier Transform) to retrieve the original information.

OFDMA (Orthogonal Frequency Division Multiple Access) provides multiple accesses by assigning subcarriers to multiple terminals for OFDM-based multiplexing.

LTE is representative of cellular wireless communication standards using OFDMA. According to the LTE, a base station assigns a frequency resource in units of the specified number of subcarriers to a predetermined time interval called a subframe corresponding to each of uplink and downlink signals.

The LTE uses an adaptive modulation technique. The technique defines multiple types of MCS (Modulation and Coding Scheme), which is modulation scheme for data packet transmission and an encoding rate for error correction codes, and selects candidates most suitable for the channel state. The base station also makes these determinations.

When a downlink data packet is transmitted, a subframe same as the data packet is used to transmit downlink control information including a frequency resource used for the data packet transmission and MCS applied to the data packet.

A terminal checks each subframe for the presence of the downlink control information targeted for the terminal itself.

When there is the downlink control information targeted for the terminal itself, the terminal references the frequency resource specified in the downlink control information and uses the MCS specified in the downlink control information to decode the received data packet.

When there is no downlink control information targeted for the terminal itself, the terminal does not perform a downlink reception process on that subframe.

As a result of decoding, the terminal transmits ACK for successful decoding or NAK for unsuccessful decoding to the base station after four subframes for the downlink data packet reception.

When notified of NAK from the terminal, the base station retransmits the data packet using HARQ (Hybrid Automatic Repeat Request).

In HARQ, a packet is divided into sub-packets to transmit successively, and received power during the retransmission is added to the accumulation of previously received power, and redundancy bits of an error correction code are added. By using the aforementioned process, the probability of successful decoding is improved as the number of retransmissions is increased.

LTE includes the concept called an HARQ process so as to manage retransmission of respective data packets. The base station can manage up to eight HARQ processes per terminal.

After transmission of a data packet, the base station can transmit the next data packet without needing to wait for ACK for the previous data packet.

LTE uses MIMO (Multiple-Input Multiple-Output) technology that spatially multiplexes a data packet and transmits the data packet using the same frequency and time resource to increase the transmission capacity.

Of the MIMO technology, Multiple Codeword MIMO (MCW-MIMO) technology spatially multiplexes multiple data packets. LTE supports spatial multiplexing of up to two data packets.

When MCW-MIMO is applied, a terminal is notified of the MCS equivalent to two data packets using one set of downlink control information.

A HARQ of the MCW-MIMO manages retransmission equivalent to two data packets as one HARQ process.

SUMMARY OF THE INVENTION

When two data packets are spatially multiplexed by using MCW-MIMO, only one data packet may be successfully decoded and the other may be unsuccessfully decoded.

When this situation occurs in two or more different HARQ processes, two or more data packets need to be retransmitted.

Similarly, two or more data packets may need to be retransmitted when there are two or more HARQ processes of SISO (Single-Input Single-Output) or SCW-MIMO (Single Codeword MIMO) transmission. The two or more data packets need to be individually retransmitted one by one because the data packets are transmitted from different HARQ processes.

Even when a transmission situation allows two data packets to be spatially multiplexed, only one data packet is transmitted, degrading the usage efficiency of frequency and time resources.

As a method of improving the usage efficiency of resources in the entire system, an initial transmission packet may be spatially multiplexed to be transmitted as a retransmission packet.

According to this method, however, a specific terminal may continue to exclusively use the resources and prevent the other terminals from being provided with equal opportunity in transmission.

FIG. 1 schematically shows the problem in spatial multiplexing between a retransmission packet and an initial transmission packet.

The problem will be described with reference to FIG. 1.

According to the example in FIG. 1, a base station uses MCW-MIMO to transmit data packets A and B at subframe T1. A terminal has received only data packet A. Data packet B needs to be retransmitted.

In this case, the base station uses MCW-MIMO to transmit retransmission packet B and initial transmission packet C at subframe T1+8.

As a result, the terminal may have received only packet B. Packet C may need to be retransmitted. The base station then uses MCW-MIMO to transmit retransmission packet C and initial transmission packet D at subframe T1+16.

When such a situation continues, the base station repeats the MCW-MIMO transmission of a retransmission packet and an initial transmission packet every eight subframes. As a result, the destination terminal continues to exclusively use the resource.

When the above-mentioned situation occurs in multiple HARQ processes, the specific terminal continues to exclusively use multiple resources, greatly decreasing the opportunity of transmission to the other terminals. The problem to be solved in the present invention is applicable not only MCW-MIMO, SISO, and SCW-MIMO as the communication systems and HARQ as the retransmission system, but also various communication and/or retransmission systems using two or more retransmission processes.

The present invention has been made in consideration of the foregoing. It is therefore an object of the present invention to reduce the amount of frequency and time resources needed to retransmit downlink signals. It is another object of the present invention to ensure equal opportunity in transmission between terminals.

To address the above-mentioned problem, for example, a base station apparatus according to the invention multiplexes independently retransmitted multiple downlink signals and simultaneously retransmits the signals to the same terminal.

According to an aspect of the invention, multiple control signals for decoding the retransmitted downlink signals can be simultaneously transmitted to the same terminal. The control signals can be mutually supplied with wireless resources assigned to the same terminal and matrices used for matrix operations to multiplex the downlink signals. The control signals contain determination information representing initial transmission or retransmission for each of data. Retransmission data is assigned the same data number as initial transmission data. A value indicating retransmission can be assigned to the determination information about data with a given data number. A value indicating initial transmission can be assigned to the determination information about data with another data number. There may be multiple carriers for transmitting the multiple downlink signals. The control signals may include identifiers for identifying retransmission processes of the downlink signals. The identifiers may be uniquely supplied to the carriers.

According to an aspect of the invention, a single control signal for decoding the retransmitted downlink signals can be simultaneously transmitted to the same terminal. The single control signal may include identifiers for identifying retransmission processes of the downlink signals. There may be multiple carriers for transmitting the multiple downlink signals. The identifiers may be uniquely supplied to the carriers.

The downlink signals may be provided with priorities and may be selected in the descending order of priorities.

A terminal according to an aspect of the invention receives a retransmission signal that is generated by multiplexing downlink signals independently processed for retransmission and is retransmitted from the same base station.

The terminal can simultaneously receive control signals for decoding the downlink signals from the same base station. The control signals contain determination information representing initial transmission or retransmission for each of the downlink signals. The terminal can decode only signals represented as retransmission by the determination information. The control signals are transmitted from a downlink control channel provided with a downlink control channel number.

The terminal confirms reception of the retransmission data that is received by referencing a control signal transmitted from the downlink control channel provided with the smallest downlink control channel number. The terminal can transmit information about the confirmation of receiving the retransmission data along with a bit corresponding to the data number specified by the control signal to the base station. The terminal can simultaneously receive a single control signal for decoding the downlink signals from the same base station.

A technique according to an aspect of the invention multiplexes multiple downlink signals independently processed for retransmission and simultaneously transmits the signals to the same terminal. This solves the problem of transmitting only one data packet even when a transmission situation allows two data packets to be spatially multiplexed. It is possible to reduce the amount of frequency and time resources needed to retransmit downlink signals.

According to an aspect of the invention, reduced resources for retransmission can be used for the other terminals, making it possible to ensure equal opportunity in transmission between terminals.

BRIEF DESCRIPTION OF THE DRAWINGS

FIG. 7A shows a sequence of transmitting downlink data packets in one HARQ process according to the first embodiment of the invention, where both data packets A and B are NAK'ed;

FIG. 7B shows a sequence of transmitting downlink data packets in one HARQ process according to the first embodiment of the invention, where data packet A or B is NAK'ed;

FIG. 9A shows an example of downlink control information for initially transmitting downlink data packets in two HARQ processes according to the first embodiment of the invention;

FIG. 9B shows another example of downlink control information for initially transmitting downlink data packets in two HARQ processes according to the first embodiment of the invention;

FIG. 10A shows an example of downlink control information for retransmitting downlink data packets in two HARQ processes according to the first embodiment of the invention;

FIG. 10B shows another example of downlink control information for retransmitting downlink data packets in two HARQ processes according to the first embodiment of the invention;

FIG. 22 shows example downlink control information for retransmitting downlink data packets in two HARQ processes according to the second embodiment of the invention;

FIG. 28A shows an example of downlink control information for initially transmitting downlink data packets in two HARQ processes according to the third embodiment of the invention;

FIG. 28B shows another example of downlink control information for initially transmitting downlink data packets in two HARQ processes according to the third embodiment of the invention;

FIG. 29A shows an example of downlink control information for retransmitting downlink data packets in two HARQ processes according to the third embodiment of the invention;

FIG. 29B shows another example of downlink control information for retransmitting downlink data packets in two HARQ processes according to the third embodiment of the invention;

FIG. 31A shows an example of two pieces of downlink control information transmitted at Step 3305 according to a fourth embodiment of the invention;

FIG. 31B shows another example of two pieces of downlink control information transmitted at Step 3305 according to a fourth embodiment of the invention;

FIG. 34A exemplifies downlink control information transmitted at Step 3301 according to the fourth embodiment of the invention; and FIG. 34B exemplifies downlink control information transmitted at Step 3302 according to the fourth embodiment of the invention.

DETAILED DESCRIPTION OF THE PREFERRED EMBODIMENTS

A. First Embodiment

1. Frame Configuration

The first embodiment of the invention will be described with reference to FIGS. 2 through 20.

Figure 2:
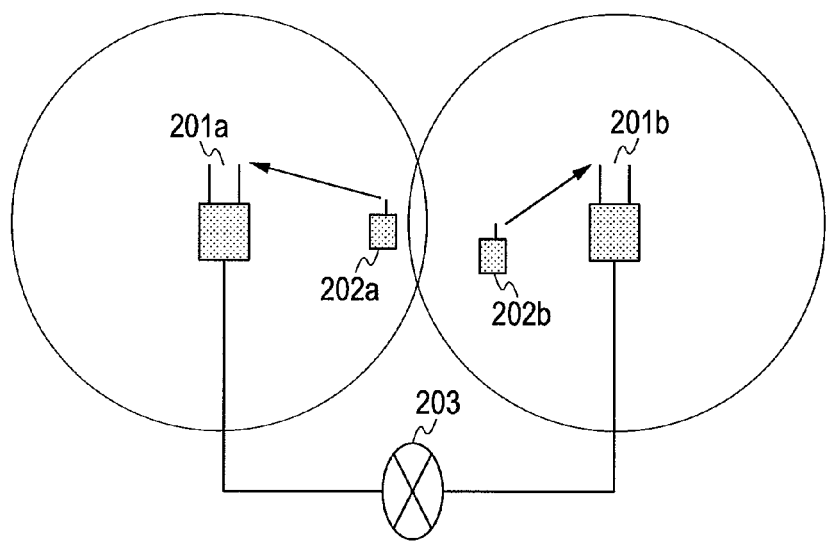
FIG. 2 is a configuration diagram showing a cellular wireless communication system.

FIG. 2 is a configuration diagram showing a cellular wireless communication system.

As shown in FIG. 2, a cellular communication system generally includes multiple base station apparatuses and terminal units. Base station apparatuses 201*a* and 201*b* are connected to a network 203 through a wired line. Terminal units 202*a* and 202*b* are respectively connected to the base station apparatuses 201*a* and 201*b* through a wireless line so as to be capable of communication with the network 203.

The base station apparatuses 201*a* and 201*b* feature the same configuration and operations and are hereafter generically referred to as a base station apparatus 201. Similarly, the terminal units 202*a* and 202*b* are generically referred to as a terminal unit 202.

In the following description, the wireless line is assumed to comply with LTE specifications but is not limited thereto. For example, 3GPP TS 36.211 Version 8.6.0 provides a detailed description about the LTE wireless line specifications.

Figure 3:
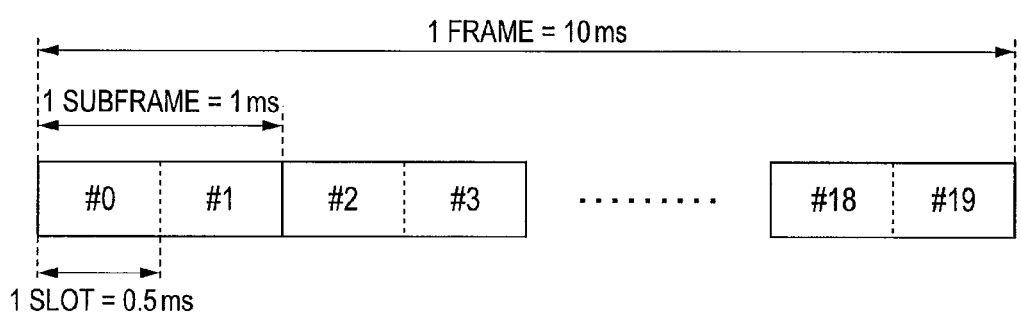
FIG. 3 is a configuration diagram showing an LTE radio frame.

FIG. 3 shows an LTE radio frame configuration.

The LTE radio frame is configured to be 10 ms. The radio frame is divided into ten subframes each of which is equivalent to one millisecond. A data packet is transmitted every 1-ms subframe. One subframe is divided into two slots each of which is 0.5 ms long and contains six or seven OFDM symbols. Frequency hopping is available in units of slots.

Figure 4:
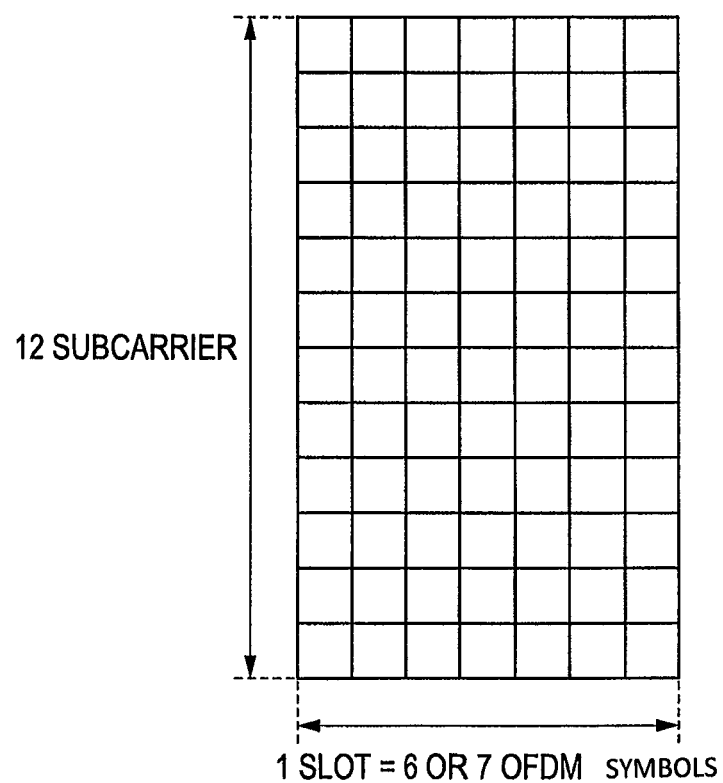
FIG. 4 is a configuration diagram showing an LTE resource block.

FIG. 4 is a configuration diagram showing an LTE resource block.

As shown in FIG. 4, a wireless resource includes 12 contiguous subcarriers per slot and is referred to as a resource block (RB). The minimum unit of the radio resource contains one OFDM symbol and one subcarrier and is referred to as a resource element (RE).

Figures 5, 6:
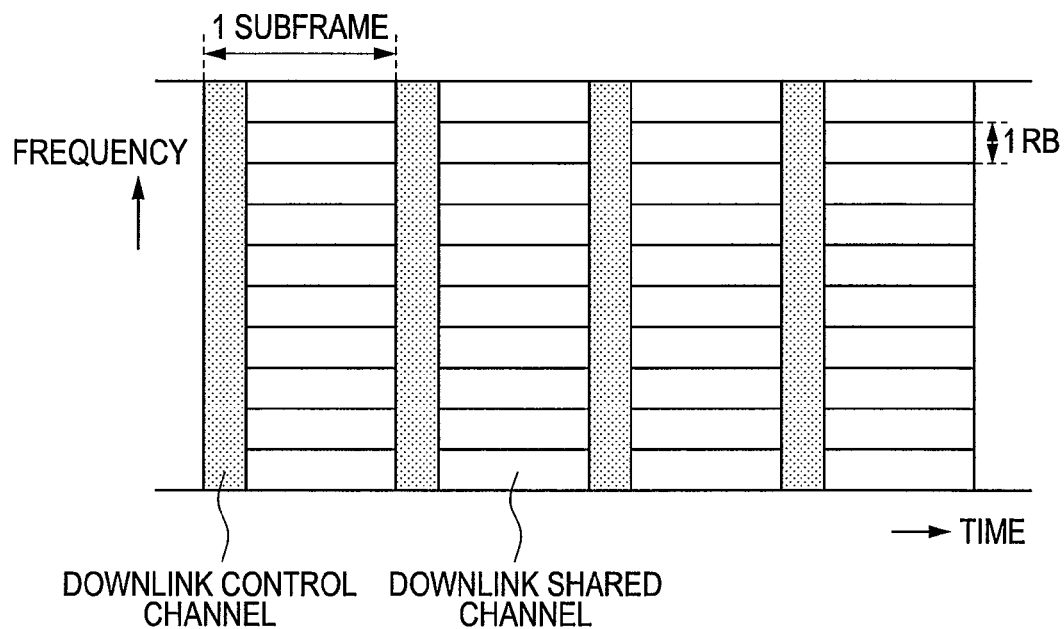
FIG. 5 is a configuration diagram showing an LTE downlink channel.
FIG. 6 shows an example of downlink control information for initially transmitting a data packet in one HARQ process according to a first embodiment of the invention.

FIG. 5 shows an LTE physical channel configuration.

One to four OFDM symbols from the beginning of the subframe configure a downlink control region. The downlink control region contains: (1) a physical channel for notifying the number of OFDM symbols dedicated to the downlink control region; (2) a physical channel for transmitting ACK/NAK from the base station in response to the uplink data packet transmission; and (3) a physical channel for transmitting downlink control information, i.e., one of information needed to receive a downlink data packet, information needed to transmit an uplink data packet, and indication of uplink transmission power.

A physical channel for transmitting downlink control information is hereafter referred to as a downlink control channel.

The downlink control channel uses a CCE (Control Channel Element) as a unit that contains 36 REs.

The downlink control channel is assigned to a portion of the downlink control region. The terminal attempts to decode a range of the portion predetermined for a terminal identification number supplied from the base station.

When the attempt results in a successfully decoded CCE, the terminal references the downlink control information contained in that CCE.

Since the following describes the downlink data packet transmission, the "downlink control information" is assumed to signify the information needed to receive data packets.

The terminals can share the region up to the end of the subframe followed by the downlink control region. The region contains the physical channel for transmitting downlink data packets.

In the following description, the physical channel is referred to as a downlink shared channel.

The scheduler of the base station assigns 12 successive subcarriers, i.e., a frequency resource, to each downlink shared channel. The minimum unit of the frequency resource is equivalent to the amount of frequency resource for an RB. For example, the time resource is assigned on the basis of one subframe (two slots). The amount of resource dedicated to the downlink shared channel is often expressed in the number of RBs.

2. Downlink Control Information and Communication Sequence

FIG. 6 exemplifies downlink control information transmitted from the base station to the terminal during MCW-MIMO transmission of data packets.

The downlink control information contains such fields as resource allocation information (RB index), Process ID, Swap, NDI (New Data Indicator), MCS, RV (Redundancy Version), and PMI (Precoding Matrix Index).

The resource allocation information represents the number of RBs assigned to the downlink shared channel and the position in the frequency direction.

The process ID signifies an identification number given to an HARQ process to which the data packet belongs. The process ID is provided with a value ranging from 0 to 7 and is shown as P1 according to the example in FIG. 6.

Swap indicates the correspondence between data packets and MCW-MIMO layers. When given value 0, Swap indicates the correspondence between the first data packet and the first layer and between the second data packet and the second layer.

When given value 1, Swap indicates the correspondence between the first data packet and the second layer and between the second data packet and the first layer.

NDI provides 1-bit identification information representing whether the data packet is initially transmitted or retransmitted. In initial transmission, the NDI bit corresponding to the preceding transmission in the same HARQ process is inverted. In retransmission, the NDI bit is not inverted.

MCS represents an MCS number applied to the data packet. The MCS numbers are defined in Table 7.1.7.1-1 of 3GPP TS 36.213 Version 8.6.0, for example.

RV is provided with a value ranging from 0 to 3 and indicates which part of data to which error correction coding is applied in the data packet is transmitted.

PMI indicates a precoding matrix number used in the matrix operation (precoding) for spatial multiplexing. The precoding matrix numbers are defined in Tables 5.3.3.1.5-4 and 5.3.3.1.5-5 of 3GPP TS 36.212 Version 8.6.0, for example.

According to MCW-MIMO, MCS, NDI, and RV are specified for each of the two data packets.

The other fields are common to the two data packets.

FIG. 7 (7A and 7B) shows sequences of transmitting downlink data packets in one HARQ process.

At subframe T, a base station 201 transmits data packets A and B to a terminal 202 using MCW-MIMO. At the same time, the base station 201 transmits downlink control information containing information needed for decoding data packets A and B to the terminal 202 (Step 701). The terminal 202 receives the data packets and the downlink control information and then transmits ACK/NAK indication to the base station 201 at subframe T+4 (Step 702).

The ACK/NAK indication transmitted at Step 702 may indicate that both data packets A and B are ACK'ed. In this case, the transmission of data packets A and B is completed.

FIG. 7A shows the sequences in a case that both data packets A and B are NAK'ed. Similarly to Step 701, the base station 201 retransmits data packets A and B to the terminal 202 using MCW-MIMO at subframe T' subsequent to T+4 and simultaneously transmits the downlink control information to the terminal 202 (Step 703a). The terminal 202 receives the data packets and the downlink control information and then transmits the ACK/NAK indication to the base station 201 subframe T'+4 (Step 704a).

FIG. 7B shows the sequences in a case that either data packet A or B is NAK'ed. The base station 201 retransmits the NAK'ed data packet to the terminal 202 at subframe T" subsequent to T+4. The base station 201 may transmit a new data packet along with the data packet to be retransmitted using MCW-MIMO. The new data packet differs from the retransmitted data packet. The base station 201 retransmits the data packets and the downlink control information needed for decoding these data packets to the terminal 202 (Step 703b). The terminal 202 receives the data packets and the downlink control information and then transmits the ACK/NAK indication to the base station 201 at subframe T"+4 (Step 704b).

Figure 8:
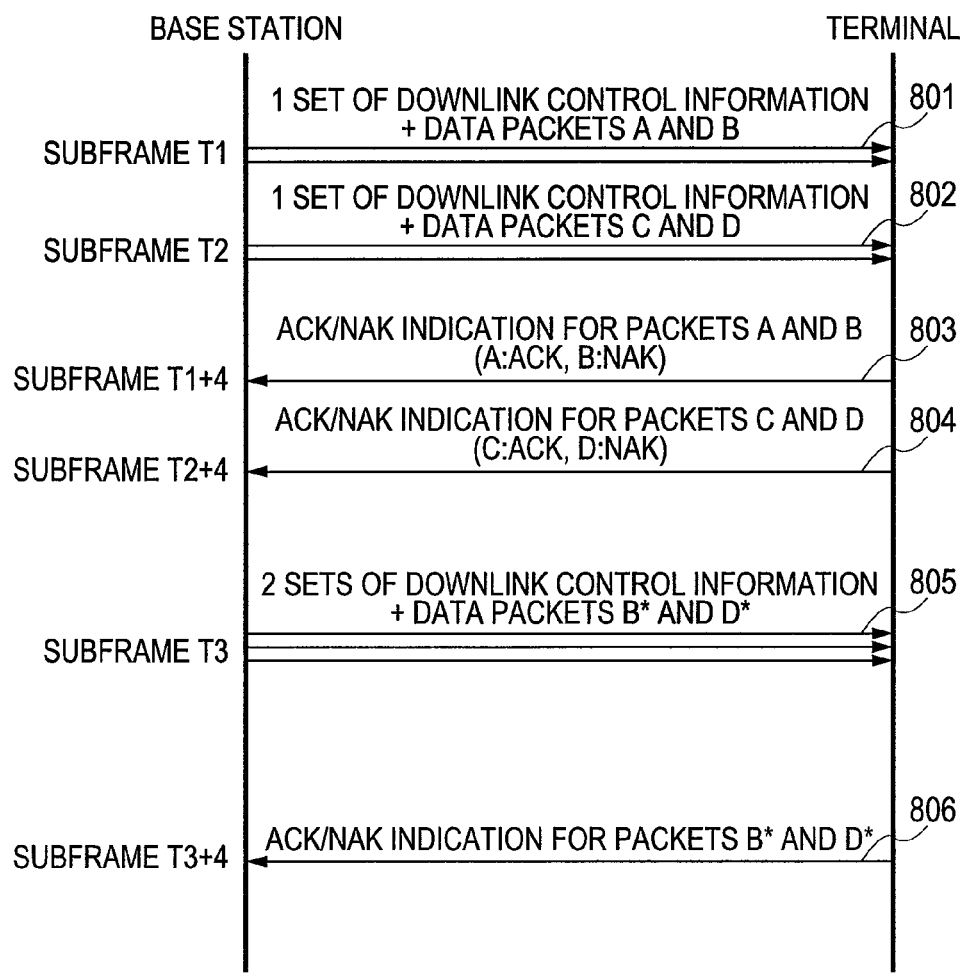
FIG. 8 shows a sequence of transmitting downlink data packets in two HARQ processes according to the first embodiment of the invention.

FIG. 8 shows a sequence of transmitting downlink data packets in two HARQ processes.

In HARQ process P1, the base station 201 transmits data packets A and B to the terminal 202 using MCW-MIMO at subframe T1. At the same time, the base station 201 transmits one set of downlink control information containing information needed for decoding data packets A and B to the terminal 202 (Step 801).

At Step 801, the process is assumed to transmit data packet A as the first data packet in the first layer and transmit data packet B as the second data packet in the second layer.

The terminal 202 receives the data packets and the downlink control information at Step 801 and then transmits the ACK/NAK indication to the base station 201 at subframe T1+4 (Step 803).

In HARQ process P2, the base station 201 transmits data packets C and D to the terminal 202 using MCW-MIMO at subframe T2 different from subframe T1. At the same time, the base station 201 transmits one set of downlink control information containing information needed for decoding data packets C and D to the terminal 202 (Step 802).

At Step 802, the process is assumed to transmit data packet C as the first data packet in the first layer and transmit data packet D as the second data packet in the second layer.

The terminal 202 receives the data packets and the downlink control information at Step 802 and then transmits the ACK/NAK indication to the base station 201 at subframe T2+4 (Step 804).

FIG. 9 (9A and 9B) exemplifies downlink control information transmitted at Steps 801 and 802.

FIG. 9A shows the downlink control information transmitted at Step 801. Process ID is set to P1. Swap is set to 0. NDI for the first data packet is set to 1. The MCS number and RV for the first data packet correspond to those applied to data packet A. NDI for the second data packet is set to 1. The MCS number and RV for the second data packet correspond to those applied to data packet B.

FIG. 9B shows the downlink control information transmitted at Step 802. Process ID is set to P2. Swap is set to 0. NDI for the first data packet is set to 1. The MCS number and RV for the first data packet correspond to those applied to data packet C. NDI for the second data packet is set to 1. The MCS number and RV for the second data packet correspond to those applied to data packet D.

The resource allocation and PMI in FIGS. 9A and 9B may or may not use the same values.

The ACK/NAK indication transmitted at Step 802 or 804 may indicate that both data packets are ACK'ed. In this case, the data packet transmission in the HARQ process is completed. The other HARQ process is performed in accordance with Step 703a or 703b when the ACK/NAK indication indicates that at least one of data packets is NAK'ed.

Let us consider that the ACK/NAK indication transmitted at Step 803 indicates one of data packets A and B is ACK'ed and the other is NAK'ed and that the ACK/NAK indication transmitted at Step 804 indicates one of data packets C and D is ACK'ed and the other is NAK'ed.

Let us suppose that data packets A and C are ACK'ed and B and D are NAK'ed.

In this case, the base station 201 retransmits data packets B and D to the terminal using MCW-MIMO at subframe T3 subsequent to Steps 803 and 804.

At the same time, the base station 201 transmits downlink control information containing information needed for decoding data packet B and downlink control information containing information needed for decoding data packet D to the terminal 202 (Step 805). That is, the base station 201 transmits the data packets and two pieces of downlink control information at Step 805.

At Step 805, the process is assumed to transmit data packet B in the first layer and transmit data packet D in the second layer.

FIG. 10 (10A and 10B) exemplifies two pieces of downlink control information transmitted at Step 805.

In FIG. 10A, Process ID is set to P1. Swap is set to 1. NDI for the first data packet is set to 0. NDI for the second data packet is set to 1. The MCS number and RV for the second data packet correspond to those applied to data packet B. The MCS number and RV for the first data packet are assigned dummy values.

In FIG. 10B, Process ID is set to P2. Swap is set to 0. NDI for the first data packet is set to 0. NDI for the second data packet is set to 1. The MCS number and RV for the second data packet correspond to those applied to data packet D. The MCS number and RV for the first data packet are assigned dummy values.

In FIG. 10A, the MCS number and RV for data packet B are assigned to fields for the second data packet. This is because LTE requires the same data packet number for initial transmission and retransmission in MCW-MIMO.

In FIG. 10A, Swap is set to 1 because data packet B as the second data packet is transmitted in the first layer. FIG. 10B also uses the same rule to decide the data packet number and the Swap value.

The resource allocation and PMI in FIGS. 10A and 10B use the same values.

The terminal 202 receives the data packets and the downlink control information at Step 805 and then transmits the ACK/NAK indication to the base station 201 at subframe T3+4 (Step 806).

At Step 806, the terminal 202 transmits only one of a 2-bit ACK/NAK indication indicating the result of decoding the two data packets.

The following describes the rule of generating the 2-bit ACK/NAK indication.

The terminal decodes the retransmitted packet by referencing the downlink control information received at Step 805 from the downlink control channel having a smaller downlink control channel number. ACK or NAK for that decoded packet is assigned to the bit corresponding to the data packet number of the packet in the 2-bit ACK/NAK indication.

The remaining bit in the 2-bit ACK/NAK indication is assigned ACK or NAK for the retransmitted packet decoded with reference to the downlink control information transmitted through the other downlink control channel.

Figure 11:
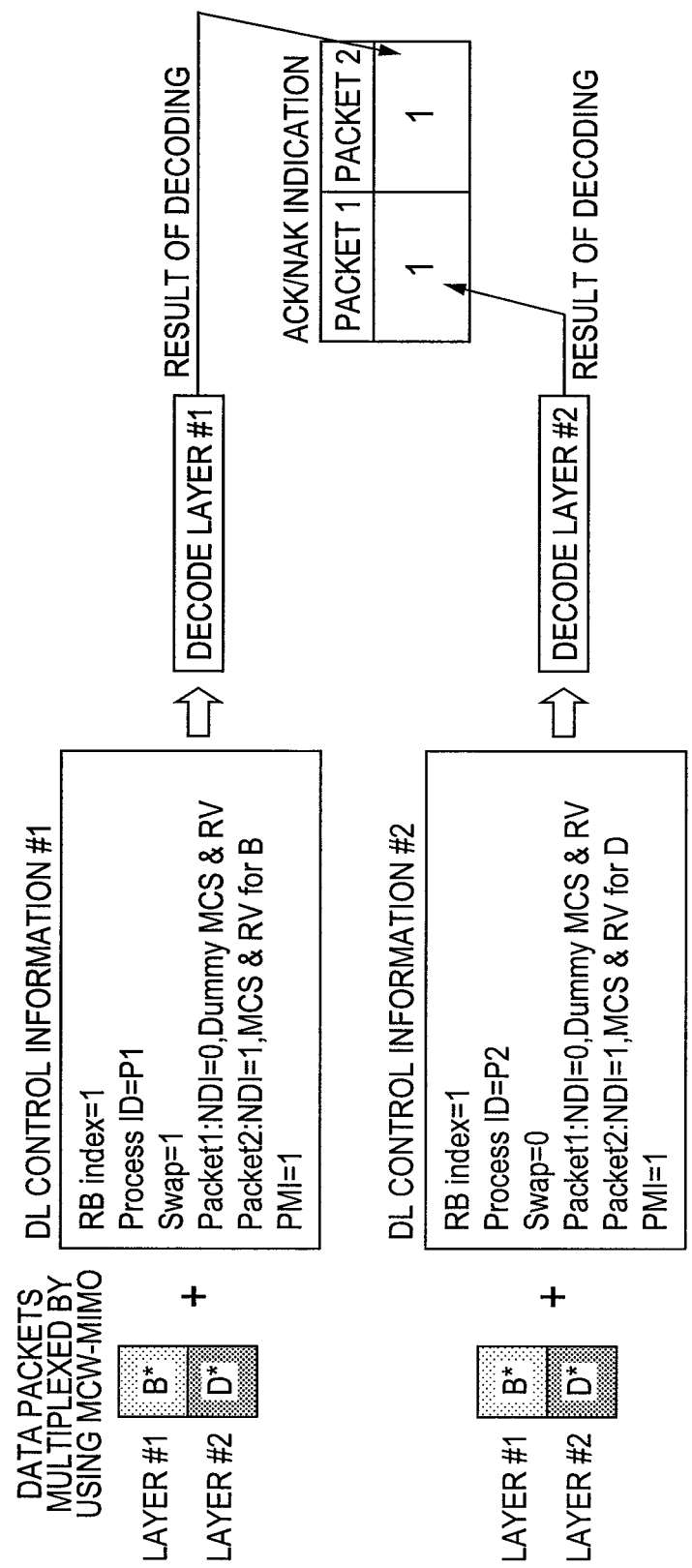
FIG. 11 schematically shows an ACK/NAK operation in a terminal unit in conformity with reception procedures according to the first embodiment of the invention.

FIG. 11 schematically shows the method of generating ACK/NAK indication when the terminal receives the downlink control information and data packets at Step 805.

Let us suppose that a smaller number is assigned to the downlink control channel for transmitting the downlink control information shown in FIG. 10A. ACK or NAK for data packet B is assigned to the bit corresponding to the second data packet equivalent to data packet B decoded with reference to FIG. 10A. ACK or NAK for data packet D is assigned to the remaining bit corresponding to the first data packet.

Some terminal units may receive only one set of downlink control information during one subframe.

The following describes how such terminal units receive data packets with two pieces of downlink control information at Step 805.

The terminal attempts to decode downlink control channels in the ascending order of downlink control channel numbers at subframe T3. When a successfully decoded downlink control channel is found, the terminal terminates the decode process on downlink control channels at that point.

The terminal then references the downlink control information contained in the decoded downlink control channel and decodes two data packets through the downlink shared channel.

The terminal can decode one of the data packets because it is provided with the correct MCS and RV in the referenced downlink control information.

However, the terminal cannot correctly decode the other data packet because that it is provided with the dummy MCS and RV.

In accordance with a decoding result, ACK or NAK is assigned to the bit corresponding to the packet number in the 2-bit ACK/NAK indication for the packet provided with the correct MCS and RV.

NAK is always assigned to the bit corresponding to the packet number in the 2-bit ACK/NAK indication for the packet provided with the dummy MCS and RV.

Figure 12:
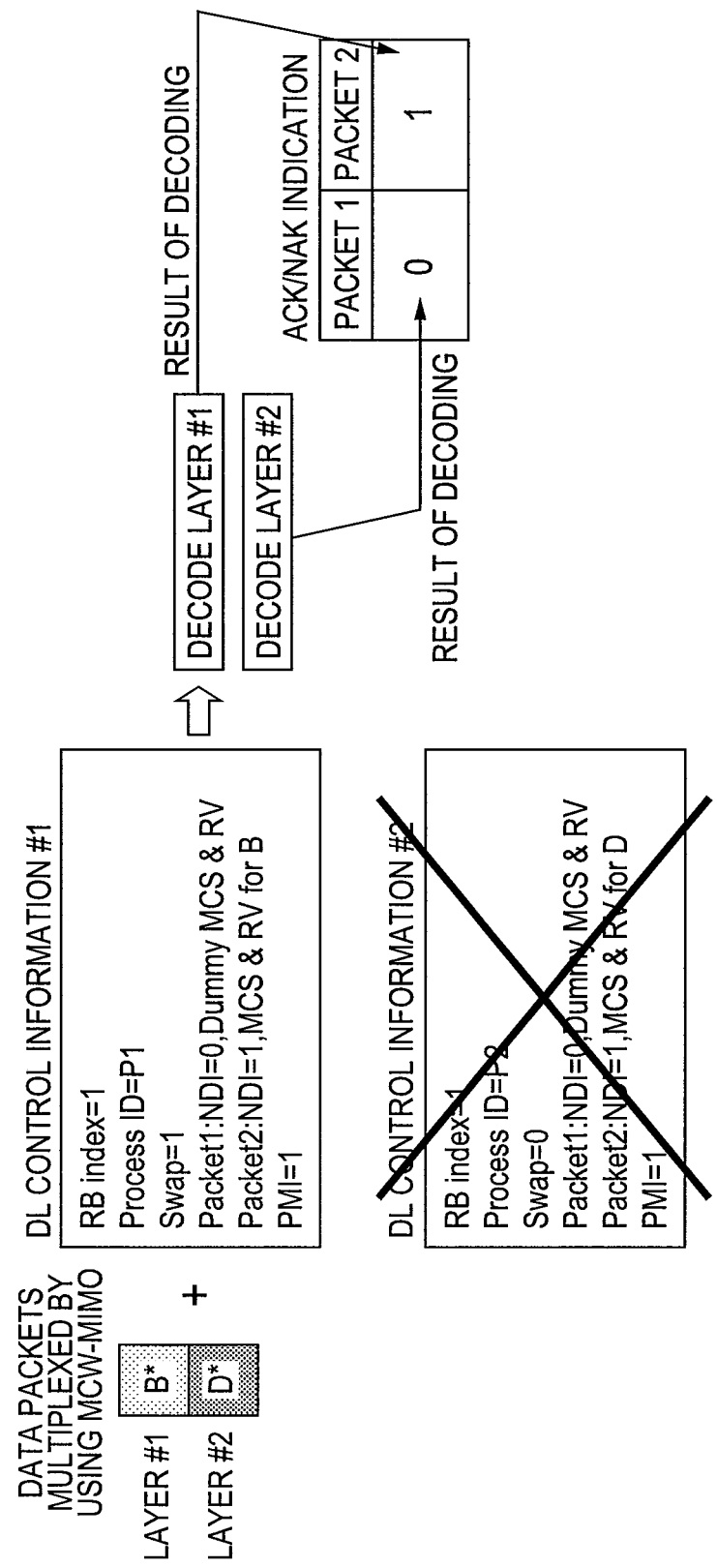
FIG. 12 schematically shows an ACK/NAK operation in a terminal unit in nonconformity with reception procedures according to the first embodiment of the invention.

FIG. 12 schematically shows the method of generating ACK/NAK indication when the terminal receives one set of downlink control information shown in FIG. 10A and data packets at Step 805.

Let us suppose that a smaller number is assigned to the downlink control channel for transmitting the downlink control information shown in FIG. 10A. The terminal 202 then references only the downlink control information shown in FIG. 10A and decodes only data packet B.

As a result, ACK or NAK for data packet B is assigned to the bit corresponding to the second data packet equivalent to data packet B. NAK is assigned to the remaining bit corresponding to the first data packet.

The following becomes apparent when FIGS. 11 and 12 are compared in terms of the 2-bit ACK/NAK indication. ACK or NAK for data packet D is assigned to the bit corresponding to the first data packet. ACK or NAK for data packet B is assigned to the bit corresponding to the second data packet.

When receiving the 2-bit ACK/NAK indication, the base station apparatus 201 can proceed to the next retransmission on data packets B and D irrespectively of whether or not the terminal receives two pieces of downlink control information at one subframe.

3. Apparatus Configuration and Operation Flows

Referring now to FIGS. 13 through 20, the following describes configurations and operation flows of the base station apparatus 201 and the terminal 202 in order to perform the operations with reference to FIGS. 8 through 11.

3-1. Base Station

Figure 13:
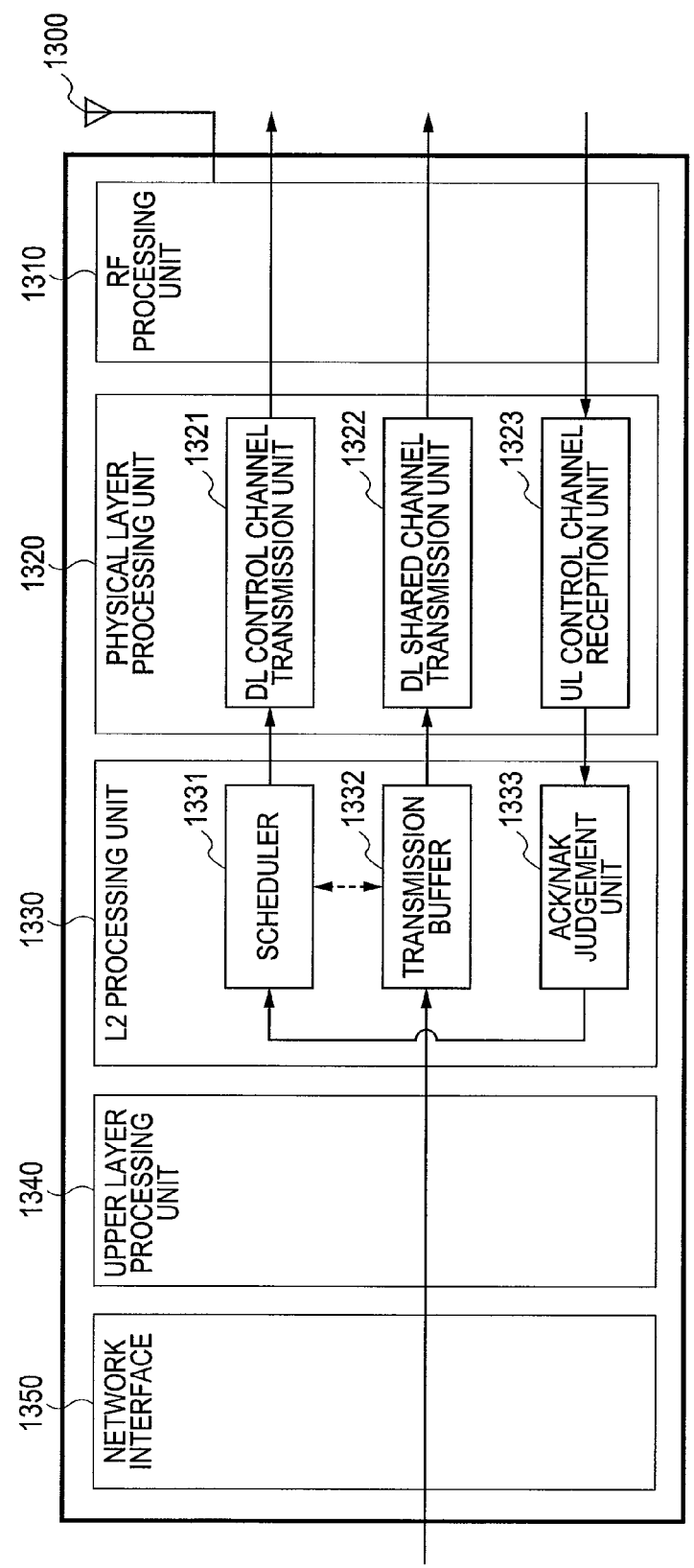
FIG. 13 is a configuration diagram showing a base station apparatus according to the first embodiment of the invention.

FIG. 13 is a block diagram showing the configuration of the base station apparatus 201.

The base station apparatus 201 includes an antenna 1300, an RF processing unit 1310, a physical layer processing unit 1320, an L2 processing unit 1330, an upper layer processing unit 1340, and a network interface 1350.

The RF processing unit 1310 modulates and demodulates carrier-frequency band signals and can use the same configuration as that of the RF processing unit 502 in FIG. 8 of JP-A-2008-211411, for example.

The physical layer processing unit 1320 processes baseband signals in the physical layer. The physical layer processing unit 1320 includes at least a downlink (DL) control channel transmission unit 1321, a downlink shared channel transmission unit 1322, and an uplink (UL) control channel reception unit 1323.

The L2 processing unit 1330 processes signals in the second layer (data link layer) of the OSI reference model. The L2 processing unit 1330 includes at least a scheduler 1331, a transmission buffer 1332, and an ACK/NAK judgment unit 1333.

The upper layer processing unit 1340 processes signals in the third layer (network layer) or higher layers of the OSI reference model.

The network interface 1350 allows the base station apparatus 201 to communicate with the other apparatuses connected to the network 203.

Figure 14:
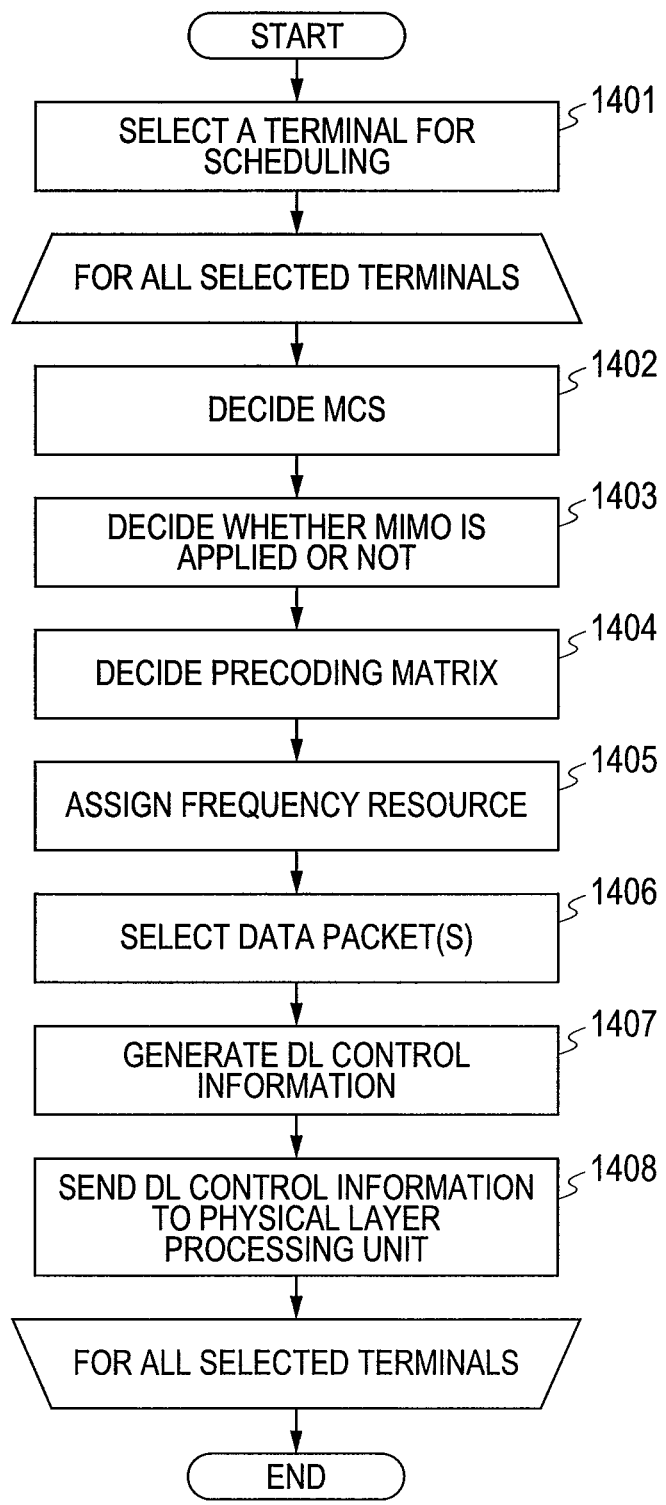
FIG. 14 is a general operational flowchart of a scheduler for the base station apparatus according to the first embodiment of the invention.

FIG. 14 shows an operational flowchart for the scheduler 1331.

The scheduler 1331 selects a terminal for scheduling from among terminals connected to the base station at every subframe (Step 1401).

For example, the proportional fairness method described in A. Jalali, R. Padovani, and R. Pankaj, "Data Throughput of CDMA-HDR High Efficiency-High Data Rate Personal Communication Wireless System," in Proceedings of Vehicular Technology Conference (VTC), vol. 3, pp. 1854-1858 may be used to select a terminal.

Upon completion of Step 1401, the scheduler 1331 repeats the following operations on all the terminals selected at Step 1401.

The scheduler 1331 decides an MCS used for transmitting downlink data packets to the terminal (Step 1402), the availability of MIMO (Step 1403), a precoding matrix (Step 1404), and position in frequency domain and the number of RBs to be assigned to the terminal (Step 1405). That is, the scheduler 1331 assigns the subframe as the time resource and the position in frequency domain as the frequency resource at Step 1405.

To decide these conditions, the scheduler 1331 references the channel quality notified from the terminal or the rank information indicating the spatial multiplicity of MIMO.

The scheduler 1331 selects a data packet to be transmitted at the subframe out of data packets that are stored in the transmission buffer in wait for transmission to the terminal (Step 1406).

The process at Step 1406 will be described in detail later.

Upon completion of Step 1406, the scheduler 1331 generates downlink control information for notifying the MCS, the availability of MIMO, the precoding matrix, and the RB decided at Steps 1402, 1403, 1404, and 1405 (Step 1407) and notifies the downlink control information to the physical layer processing unit 1320 (Step 1408).

Figure 15:
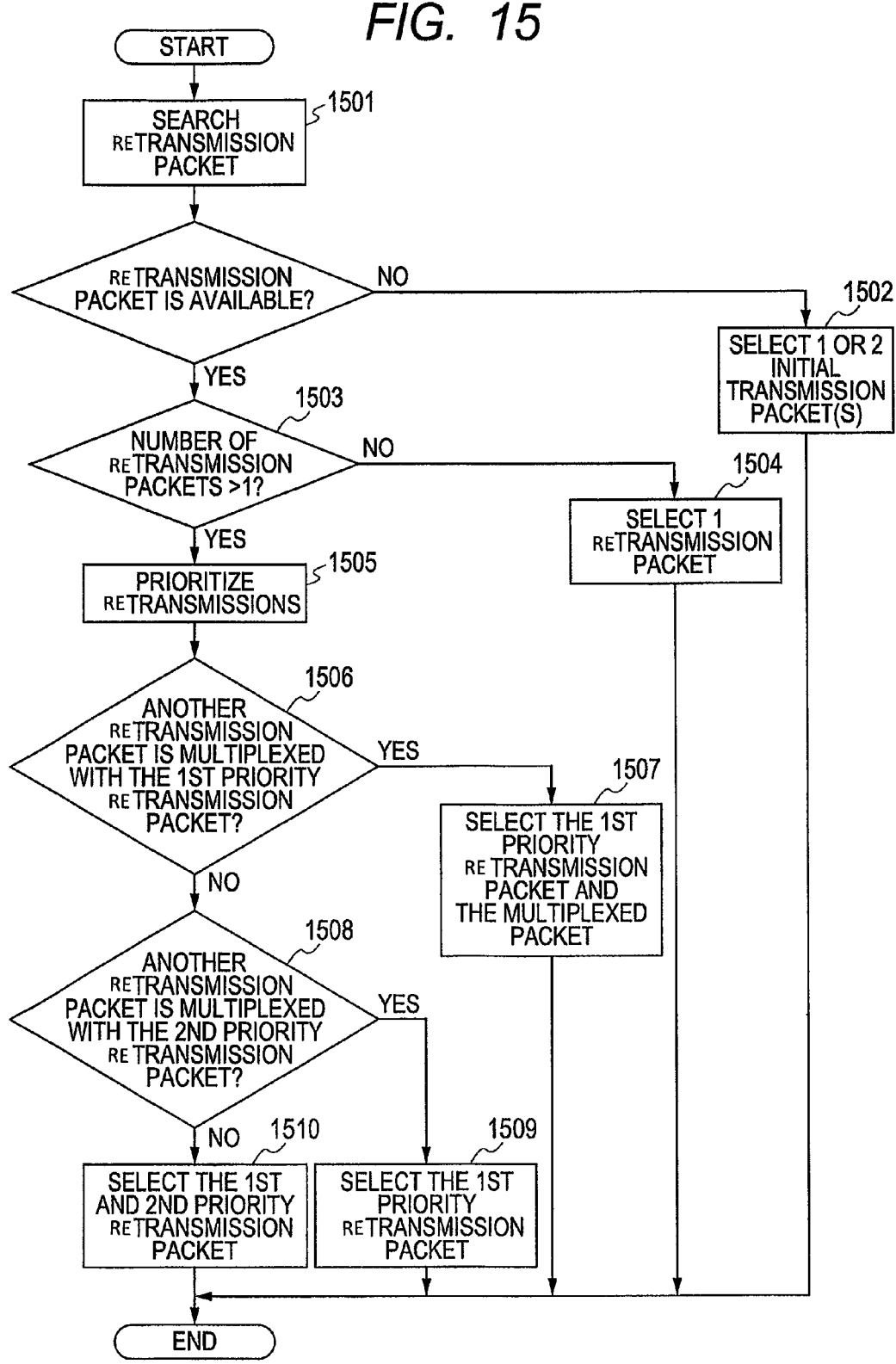
FIG. 15 is a detailed operational flowchart showing a transmission-targeted packet selection process of the scheduler for the base station apparatus according to the first embodiment of the invention.

FIG. 15 shows an operational flowchart for the scheduler 1331 to select a data packet at Step 1406.

It is assumed that Step 1403 specifies the use of MIMO for transmitting downlink data packets to the terminal.

The scheduler 1331 searches for a data packet to be retransmitted out of data packets in wait for transmission to the terminal (Step 1501).

Suppose, as a result of Step 1501, the scheduler 1331 does not find a data packet that waits for transmission and needs to be retransmitted. Such a data packet is hereafter referred to as a retransmission packet. The scheduler 1331 then selects a data packet initially transmitted to the terminal (Step 1502) and terminates the process.

When a retransmission packet is available as a result of Step 1501, the scheduler 1331 decides whether or not two or more retransmission packets are available (Step 1503). When one retransmission packet is available, the scheduler 1331 selects it (Step 1504) and terminates the process. Step 1504 may be configured to additionally select one packet to be initially transmitted.

When two or more retransmission packets are available as a result of Step 1503, the scheduler 1331 prioritizes the retransmission packets (Step 1505). A higher priority may be assigned to a retransmission packet that indicates a longer lapse of time from the time point of initial transmission. Alternatively, priorities may be decided based on the amount of packet data or on packet types.

The scheduler 1331 decides whether or not there is another retransmission packet MIMO-multiplexed at the time of previously transmitting the retransmission packet assigned the first priority at Step 1505 (Step 1506). When the other retransmission packet is available, the scheduler 1331 selects the two retransmission packets (Step 1507) and terminates the process.

A result of Step 1506 may indicate that there is no retransmission packet MIMO-multiplexed at the time of previously transmitting the first-priority retransmission packet. In this case, the scheduler 1331 decides whether or not there is another retransmission packet MIMO-multiplexed at the time of previously transmitting the retransmission packet assigned the second priority at Step 1505 (Step 1508).

When the other retransmission packet is available as a result of Step 1508, the scheduler 1331 selects only the first-priority retransmission packet (Step 1509) and terminates the process. This is because the scheduler 1331 cannot retransmit the first-priority and second-priority retransmission packets at a time.

When no other retransmission packet is available as a result of Step 1508, the scheduler 1331 selects one first-priority retransmission packet and one second-priority retransmission packet (Step 1510) and terminates the process.

Prioritizing retransmission packets makes is possible to preferentially retransmit data the terminal needs to receive, for example.

Figure 16:
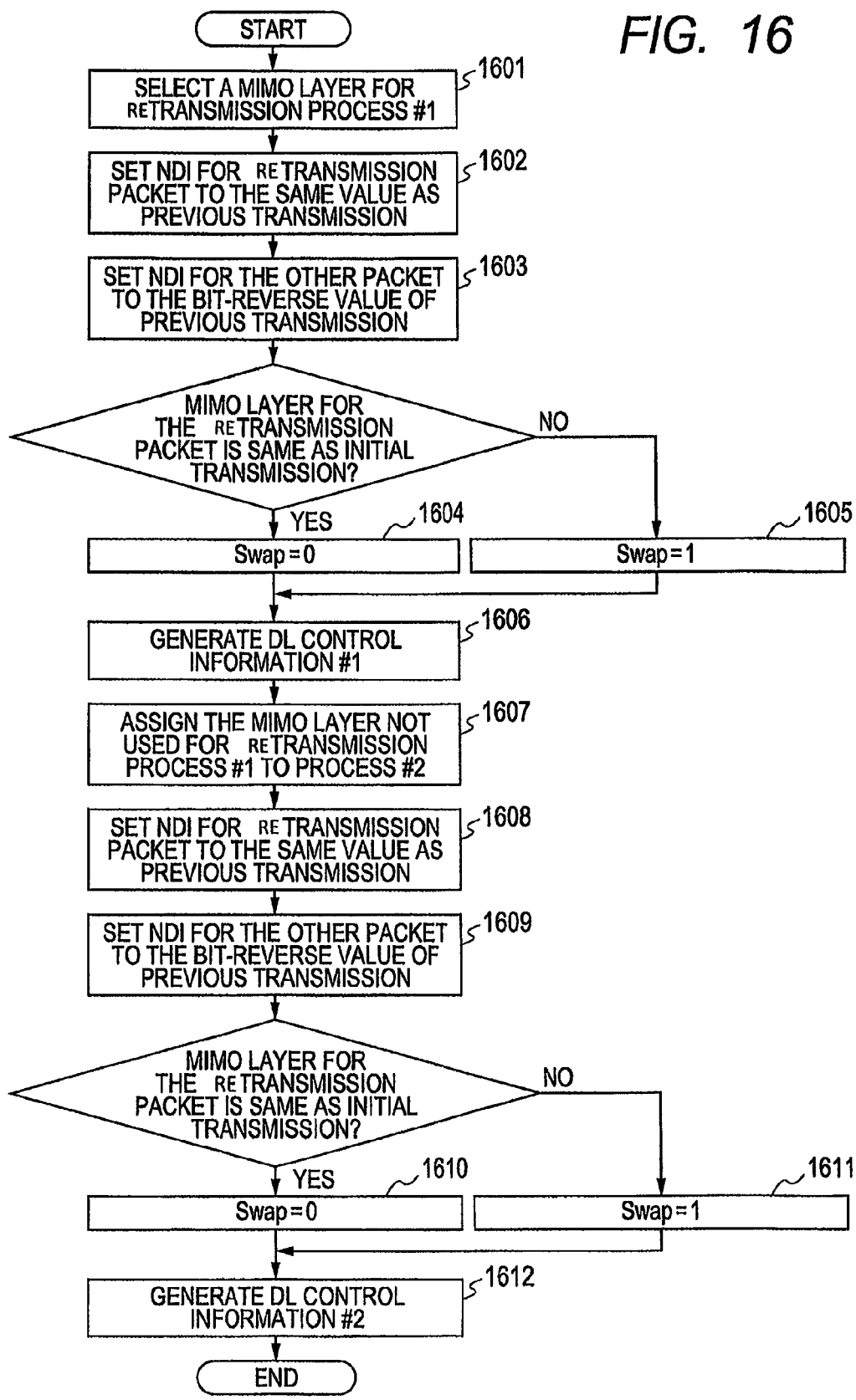
FIG. 16 is a detailed operational flowchart showing a downlink control information generation process of the scheduler for the base station apparatus according to the first embodiment of the invention.

FIG. 16 is an operational flowchart showing a downlink control information generation process at Step 1407 for the scheduler 1331.

The scheduler 1331 selects a layer used for retransmission of data packets in the first retransmission process (Step 1601). The scheduler 1331 sets the NDI for the packet number (layer number) of the relevant data packet to the same value (retransmission) as the previous transmission (Step 1602). The scheduler 1331 sets the NDI for the other packet number (layer number) to a bit-inverted value (initial transmission) of the value for the previous transmission (Step 1603).

The layer selected at Step 1331 may be the same as the layer used for initially transmitting the data packet. In this case, the scheduler 1331 sets the Swap value to 0 (Step 1604). Otherwise, the scheduler 1331 sets the Swap value to 1 (Step 1605).

The scheduler 1331 generates the first downlink control information using the Swap value and the other values (RB index, Process ID, MCS, RV, and PMI) decided at Steps 1402, 1403, 1404, and 1405 (Step 1606).

The scheduler 1331 defines the layer not selected at Step 1601 for retransmission in the first retransmission process as a layer used for data packet retransmission in the second retransmission process (Step 1607). The scheduler 1331 sets the NDI for the packet number of the relevant data packet to the same value (retransmission) as the previous transmission (Step 1608). The scheduler 1331 sets the NDI for the other packet number to a bit-inverted value (initial transmission) of the value for the previous transmission (Step 1609).

The layer selected at Step 1607 may be the same as the layer used for initially transmitting the data packet. In this case, the scheduler 1331 sets the Swap value to 0 (Step 1610). Otherwise, the scheduler 1331 sets the Swap value to 1 (Step 1611).

The scheduler 1331 generates the second downlink control information using the Swap value and the other values (RB index, Process ID, MCS, RV, and PMI) decided at Steps 1402, 1403, 1404, and 1405 (Step 1612).

3-2. Terminal

Figure 17:
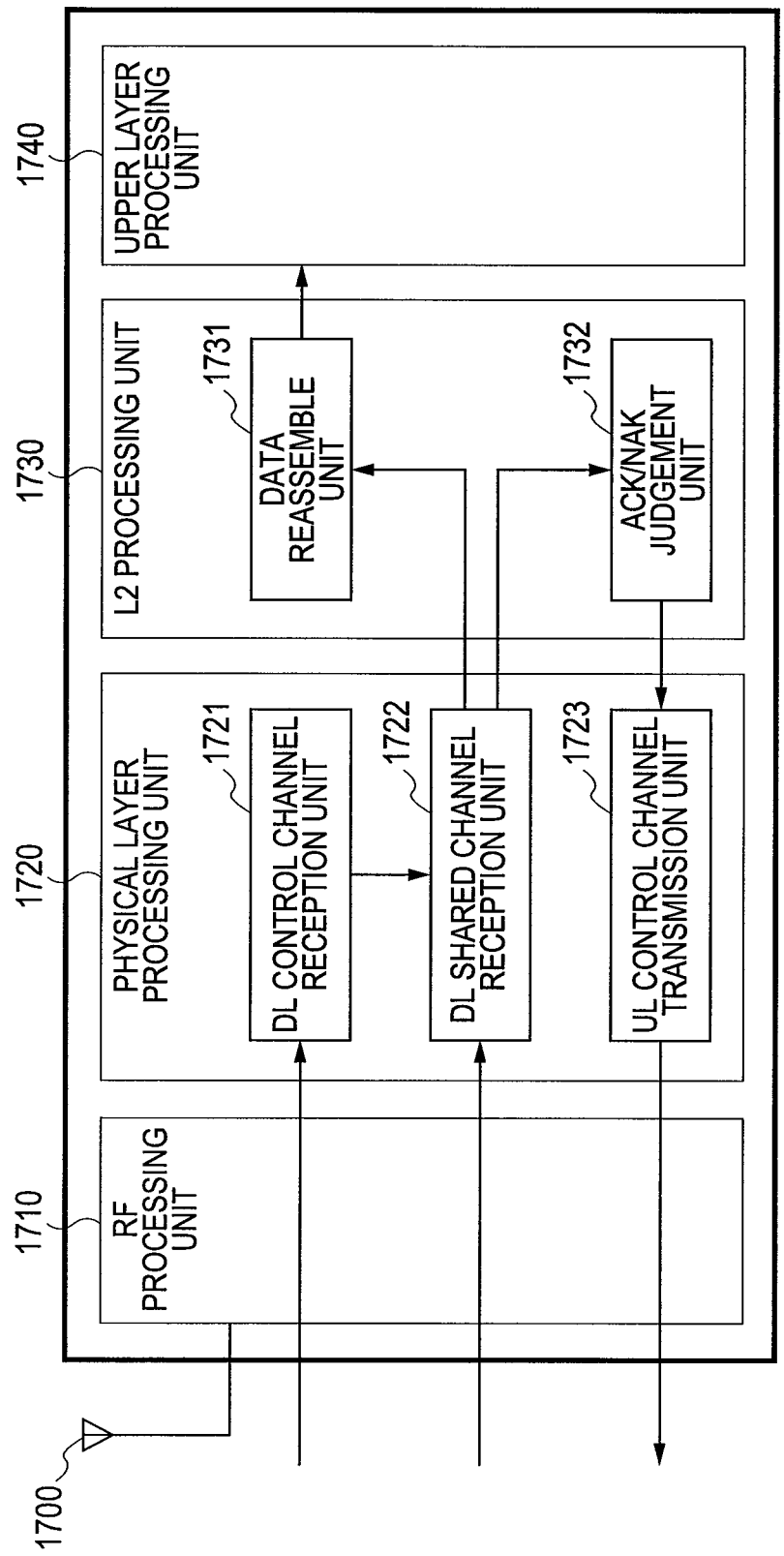
FIG. 17 is a configuration diagram showing a terminal unit according to the first embodiment of the invention.

FIG. 17 is a block diagram showing a configuration of the terminal unit 202.

The terminal unit 202 includes an antenna 1700, an RF processing unit 1710, a physical layer processing unit 1720, an L2 processing unit 1730, and an upper layer processing unit 1740.

The RF processing unit 1710 modulates and demodulates carrier-frequency band signals and can use the same configuration as that of the RF processing unit 602 in FIG. 9 of JP-A-2008-211411, for example.

The physical layer processing unit 1720 processes baseband signals in the physical layer. The physical layer processing unit 1720 includes at least a downlink control channel reception unit 1721, a downlink shared channel reception unit 1722, and an uplink control channel transmission unit 1723.

The L2 processing unit 1730 processes signals in the second layer (data link layer) of the OSI reference model. The L2 processing unit 1730 includes at least a data reassemble unit 1731 and an ACK/NAK judgment unit 1732.

The upper layer processing unit 1740 processes signals in the third layer (network layer) or higher layers of the OSI reference model.

Figure 18:
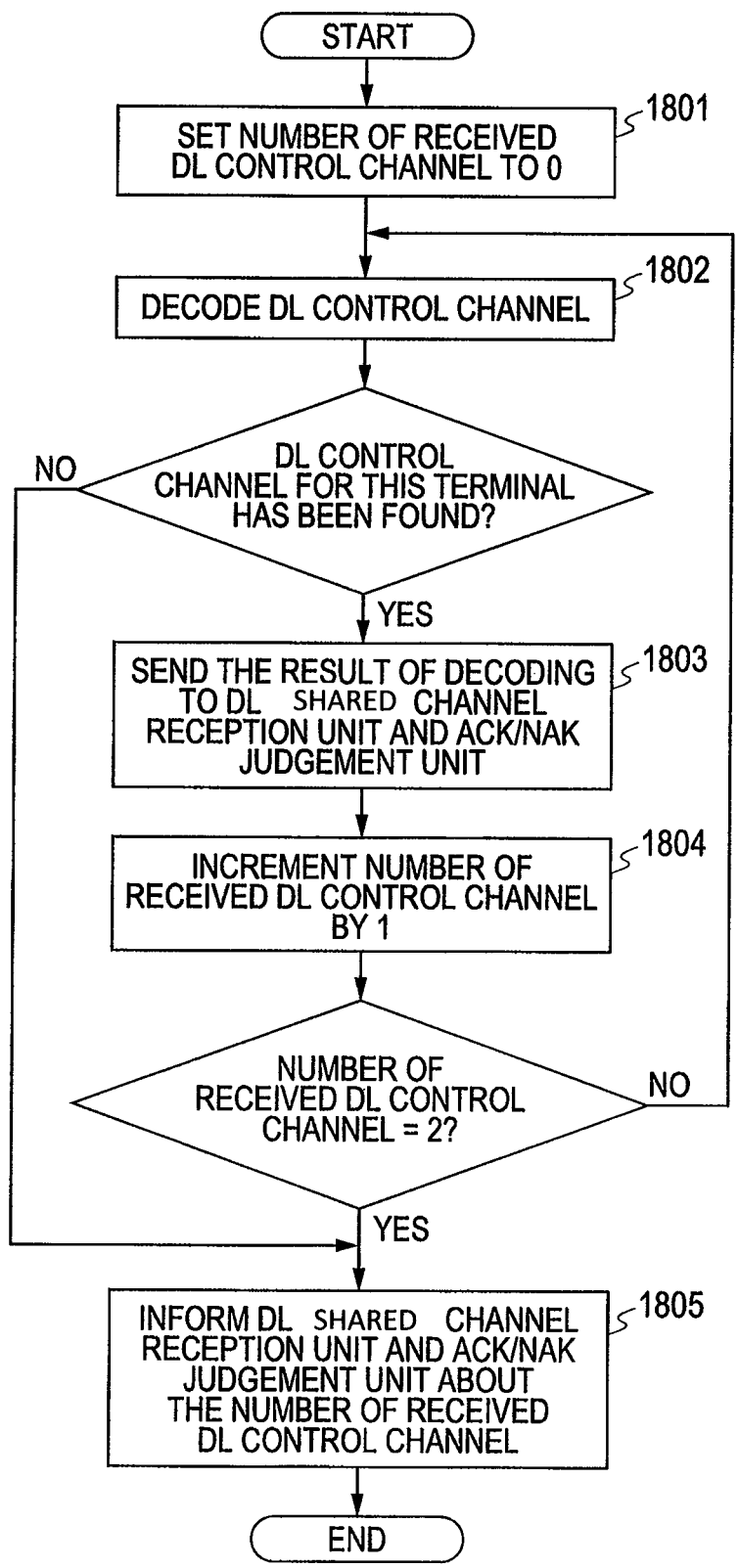
FIG. 18 is an operational flowchart of a downlink control channel reception unit in the terminal unit according to the first embodiment of the invention.

FIG. 18 shows an operational flowchart of the downlink control channel reception unit 1721 at every subframe. To start processing a new subframe, the downlink control channel reception unit 1721 resets a downlink control channel reception count to 0 (Step 1801). The downlink control channel reception unit 1721 attempts to decode the downlink control channel (Step 1802).

When a successfully decoded downlink control channel is available as a result of Step 1802, the downlink control channel reception unit 1721 decides that the decoded information is equivalent to the downlink control information addressed to the terminal. The downlink control channel reception unit 1721 notifies the content to the downlink shared channel reception unit 1722 and the ACK/NAK judgment unit 1732 (Step 1803). The downlink control channel reception unit 1721 increments the downlink control channel reception count by 1 (Step 1804).

The downlink control channel reception unit 1721 decides whether or not the downlink control channel reception count is equal to 2. When the count is equal to 1, the downlink control channel reception unit 1721 repeats Step 1802.

When the downlink control channel reception count is equal to 2, the downlink control channel reception unit 1721 notifies the downlink control channel reception count to the downlink shared channel reception unit and the ACK/NAK judgment unit (Step 1805) and terminates the process.

When a successfully decoded downlink control channel is unavailable as a result of Step 1802, the downlink control channel reception unit 1721 decides that there is no other downlink control information addressed to the terminal than those acquired so far. Control then proceeds to Step 1805.

Figure 19:
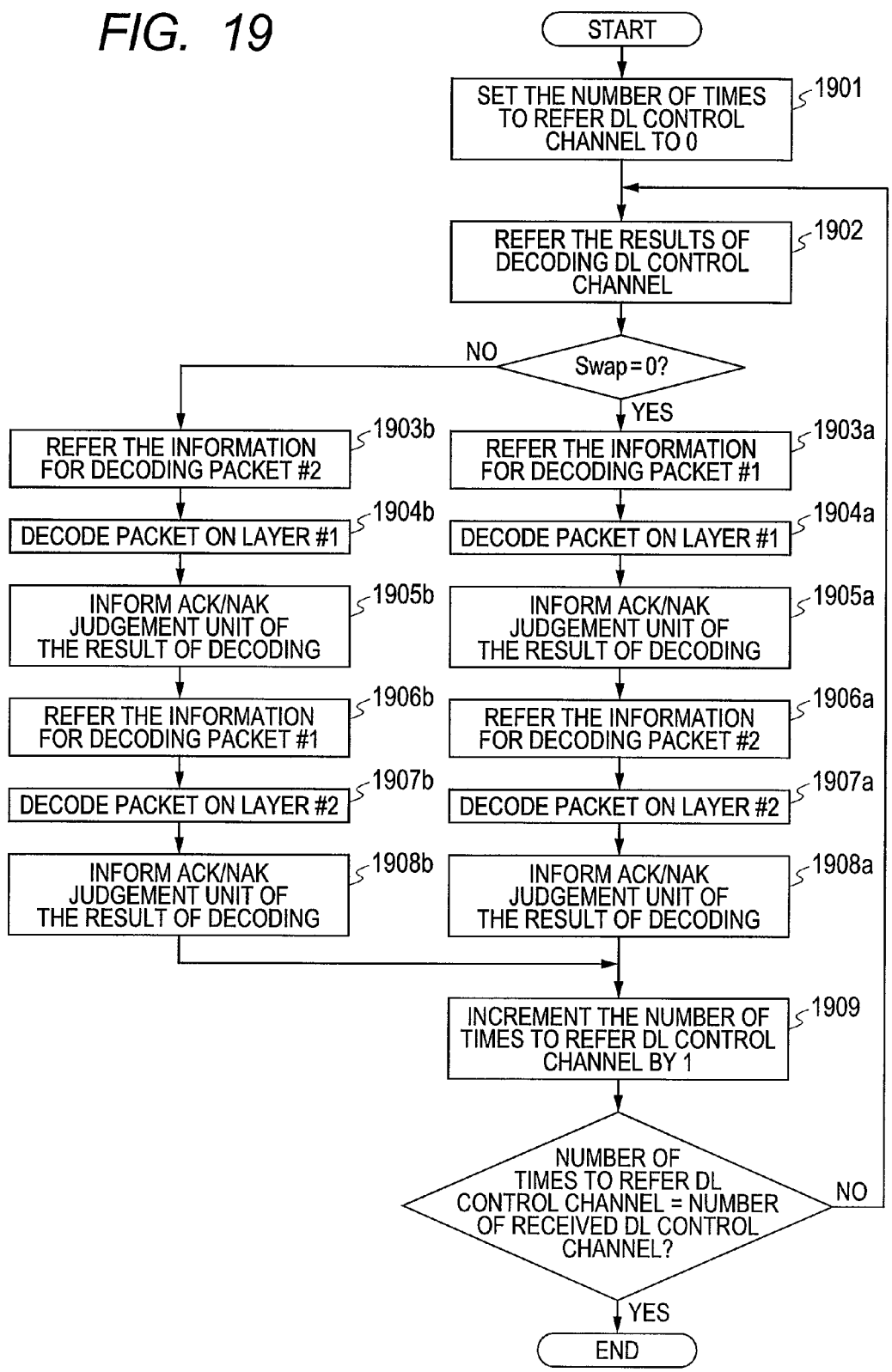
FIG. 19 is an operational flowchart of a downlink shared channel reception unit in the terminal unit according to the first embodiment of the invention.

FIG. 19 shows an operational flowchart of the downlink shared channel reception unit 1722 when the downlink control channel reception unit notifies a result of decoding the downlink control channel at Step 1803. To start processing a new subframe, the downlink shared channel reception unit 1722 resets a downlink control information reference count to 0 (Step 1901). The downlink shared channel reception unit 1722 references the downlink control channel decoding result notified at Step 1803 (Step 1902).

When the downlink control channel decoding result contains the Swap value set to 0, the downlink shared channel reception unit 1722 references MCS, NDI, and RV for the first data packet contained in the decoding result (Step 1903a). The downlink shared channel reception unit 1722 decodes the first layer of the relevant downlink shared channel (Step 1904a). The downlink shared channel reception unit 1722 notifies the result as a result of decoding the first data packet to the ACK/NAK judgment unit 1732 (Step 1905a). The downlink shared channel reception unit 1722 references MCS, NDI, and RV for the second data packet contained in the downlink control channel decoding result (Step 1906a). The downlink shared channel reception unit 1722 decodes the second layer for the relevant downlink shared channel (Step 1907a). The downlink shared channel reception unit 1722 notifies the result of decoding the second data packet to the ACK/NAK judgment unit 1732 (Step 1908a).

When the downlink control channel decoding result contains the Swap value set to 1, the downlink shared channel reception unit 1722 references MCS, NDI, and RV for the second data packet contained in the decoding result (Step 1903b). The downlink shared channel reception unit 1722 decodes the first layer of the relevant downlink shared channel (Step 1904b). The downlink shared channel reception unit 1722 notifies the result as a result of decoding the second data packet to the ACK/NAK judgment unit 1732 (Step 1905b). The downlink shared channel reception unit 1722 references MCS, NDI, and RV for the first data packet contained in the downlink control channel decoding result (Step 1906b). The downlink shared channel reception unit 1722 decodes the second layer for the relevant downlink shared channel (Step 1907b). The downlink shared channel reception unit 1722 notifies the result of decoding the first data packet to the ACK/NAK judgment unit 1732 (Step 1908b).

When Step 1908a or 1908b is complete, the downlink shared channel reception unit 1722 increments the downlink control information reference count by 1 (Step 1909).

When the downlink control information reference count equals the downlink control channel reception count notified from the downlink control channel reception unit 1721, the downlink shared channel reception unit 1722 terminates the process. Otherwise, control returns to Step 1902.

Figure 20:
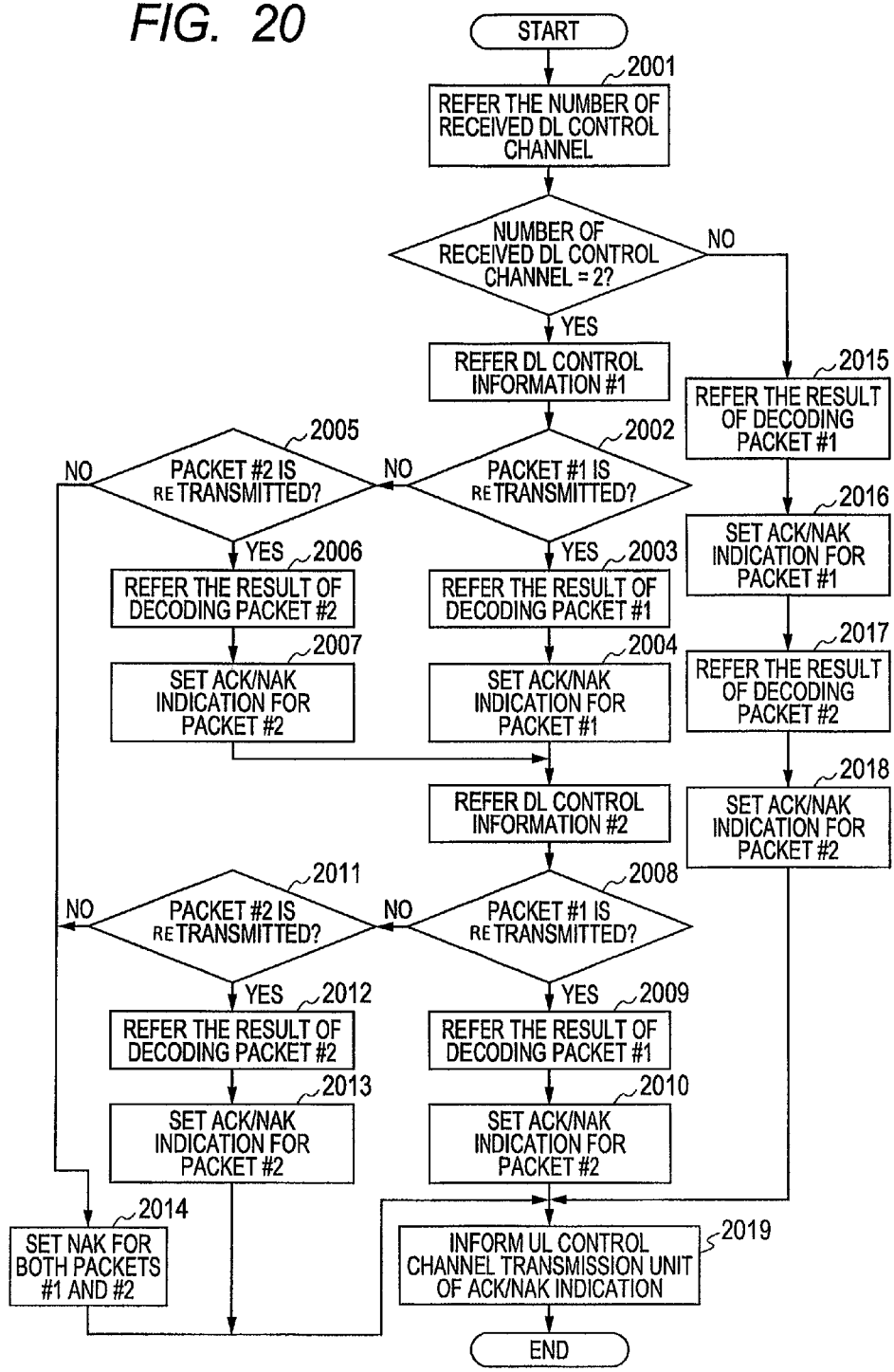
FIG. 20 is an operational flowchart of an ACK/NAK judgment unit in the terminal unit according to the first embodiment of the invention.

FIG. 20 shows an operational flowchart of the ACK/NAK judgment unit 1732.

The ACK/NAK judgment unit 1732 references the downlink control channel reception count notified at Step 1805 from downlink control channel reception unit 1721 (Step 2001). When the count value is set to 2, the ACK/NAK judgment unit 1732 references the NDI for the first data packet in the first downlink control information notified from the downlink control channel reception unit 1721 at Step 1803 and decides whether or not the first data packet is a retransmitted packet (Step 2002).

When the first data packet is a retransmitted packet as a result of Step 2002, the ACK/NAK judgment unit 1732 references the first data packet decoding result notified from the downlink shared channel reception unit 1722 (Step 2003). The ACK/NAK judgment unit 1732 assigns 1 as successful decoding or 0 as unsuccessful decoding to the bit representing the first data packet information in the ACK/NAK indication (Step 2004).

When the first data packet is not a retransmitted packet as a result of Step 2002, the ACK/NAK judgment unit 1732 references the NDI for the second data packet in the first downlink control information and decides whether or not the second data packet is a retransmitted packet (Step 2005).

When the second data packet is a retransmitted packet as a result of Step 2005, the ACK/NAK judgment unit 1732 references the second data packet decoding result notified from the downlink shared channel reception unit 1722 (Step 2006). The ACK/NAK judgment unit 1732 assigns 1 as successful decoding or 0 as unsuccessful decoding to the bit representing the second data packet information in the ACK/NAK indication (Step 2007).

When Step 2004 or 2007 is complete, the ACK/NAK judgment unit 1732 references the NDI for the first data packet in the second downlink control information notified from the downlink control channel reception unit 1721 at Step 1803 and decides whether or not the first data packet is a retransmitted packet (Step 2008).

When the first data packet is a retransmitted packet as a result of Step 2008, the ACK/NAK judgment unit 1732 references the first data packet decoding result notified from the downlink shared channel reception unit 1722 (Step 2009). The ACK/NAK judgment unit 1732 assigns 1 as successful decoding or 0 as unsuccessful decoding to the bit representing the second data packet information in the ACK/NAK indication (Step 2010).

When the first data packet is not a retransmitted packet as a result of Step 2008, the ACK/NAK judgment unit 1732 references the NDI for the second data packet in the second downlink control information and decides whether or not the second data packet is a retransmitted packet (Step 2011).

When the second data packet is a retransmitted packet as a result of Step 2011, the ACK/NAK judgment unit 1732 references the second data packet decoding result notified from the downlink shared channel reception unit 1722 (Step 2012). The ACK/NAK judgment unit 1732 assigns 1 as successful decoding or 0 as unsuccessful decoding to the bit representing the first data packet information in the ACK/NAK indication (Step 2013).

When the second data packet is not a retransmitted packet at Step 2005 or 2011, the ACK/NAK judgment unit 1732 assigns 0 to the bit representing the first data packet information and to the bit representing the second data packet information in the ACK/NAK indication (Step 2014).

When the downlink control channel reception count is set to 1 as a result of Step 2001, the ACK/NAK judgment unit 1732 references the first data packet decoding result notified from the downlink shared channel reception unit 1722 (Step 2015). The ACK/NAK judgment unit 1732 assigns 1 as successful decoding or 0 as unsuccessful decoding to the bit representing the first data packet information in the ACK/NAK indication (Step 2016).

The ACK/NAK judgment unit 1732 references the second data packet decoding result notified from the downlink shared channel reception unit 1722 (Step 2017). The ACK/NAK judgment unit 1732 assigns 1 as successful decoding or 0 as unsuccessful decoding to the bit representing the second data packet information in the ACK/NAK indication (Step 2018).

When any one of Steps 2010, 2013, 2014, and 2018 is complete, the ACK/NAK judgment unit 1732 notifies the ACK/NAK indication generated at these steps to the uplink control channel transmission unit 1723 (Step 2019) and terminates the process.

At Step 2001, the ACK/NAK judgment unit 1732 decides whether one or two downlink control channels schedule the same radio resource. When first and second packets are both newly transmitted, only one downlink control channel is used, and then control proceeds to Steps 2015 through 2018. The ACK/NAK judgment unit 1732 assumes the case to be abnormal when two downlink control channels are used and the first and second packets are both newly transmitted. In this case, the ACK/NAK judgment unit 1732 sets NAK for both the first and second packets at Step 2014.

The uplink control channel transmission unit 1723 performs the error correction coding and the modulation in response to the ACK/NAK indication notified from the ACK/NAK judgment unit 1732.

The processed ACK/NAK indication is transmitted on an uplink control channel to the base station apparatus 201 via the RF processing unit 1710.

When receiving the uplink control channel from the terminal 202, the base station apparatus 201 allows the uplink control channel reception unit 1323 to decode the received uplink control channel and notifies the resulting ACK/NAK indication to the ACK/NAK judgment unit 1333.

The ACK/NAK judgment unit 1333 references the notified ACK/NAK indication and removes the ACK'ed data packet from a transmission queue.

According to the embodiment, when each HARQ process transmits two data packets and only one of the data packets needs to be retransmitted, the retransmission operations can be consolidated into one MCW-MIMO transmission operation. The embodiment can approximately halve the amount of time-related resources needed to retransmit packets transmitted by using MCW-MIMO and improve the usage efficiency of resources.

One of two data packets transmitted by using MCW-MIMO can be decoded on a terminal that does not support the transmission/reception system according to the invention. In addition, retransmission of the above-mentioned two data packets can be continued. The embodiment is not limited to MCW-MIMO, SISO, and SCW-MIMO as the transmission techniques and HARQ as the retransmission technique as long as two or more retransmission processes are used.

B. Second Embodiment

The second embodiment of the invention will described with reference to FIGS. 21 through 26.

Figure 1:
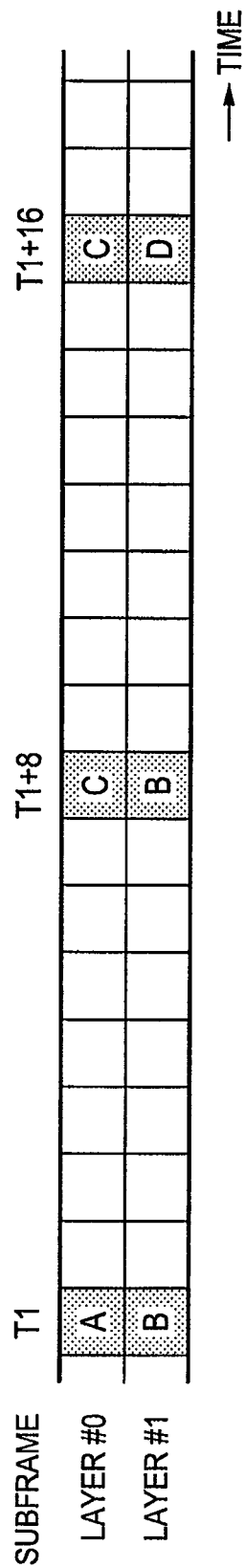
FIG. 1 schematically shows a problem in spatial multiplexing between a retransmission packet and an initial transmission packet.

The second embodiment equals the first embodiment in terms of the overall configuration including the base station apparatus 201, the terminal 202, and the network 203, and their internal hardware configuration shown in FIG. 1. The second embodiment differs from the first embodiment in operations of the base station apparatus 201 and the terminal 202 and information exchanged between the base station apparatus 201 and the terminal 202.

1. Downlink Control Information and Transmission Sequence

Figure 21:
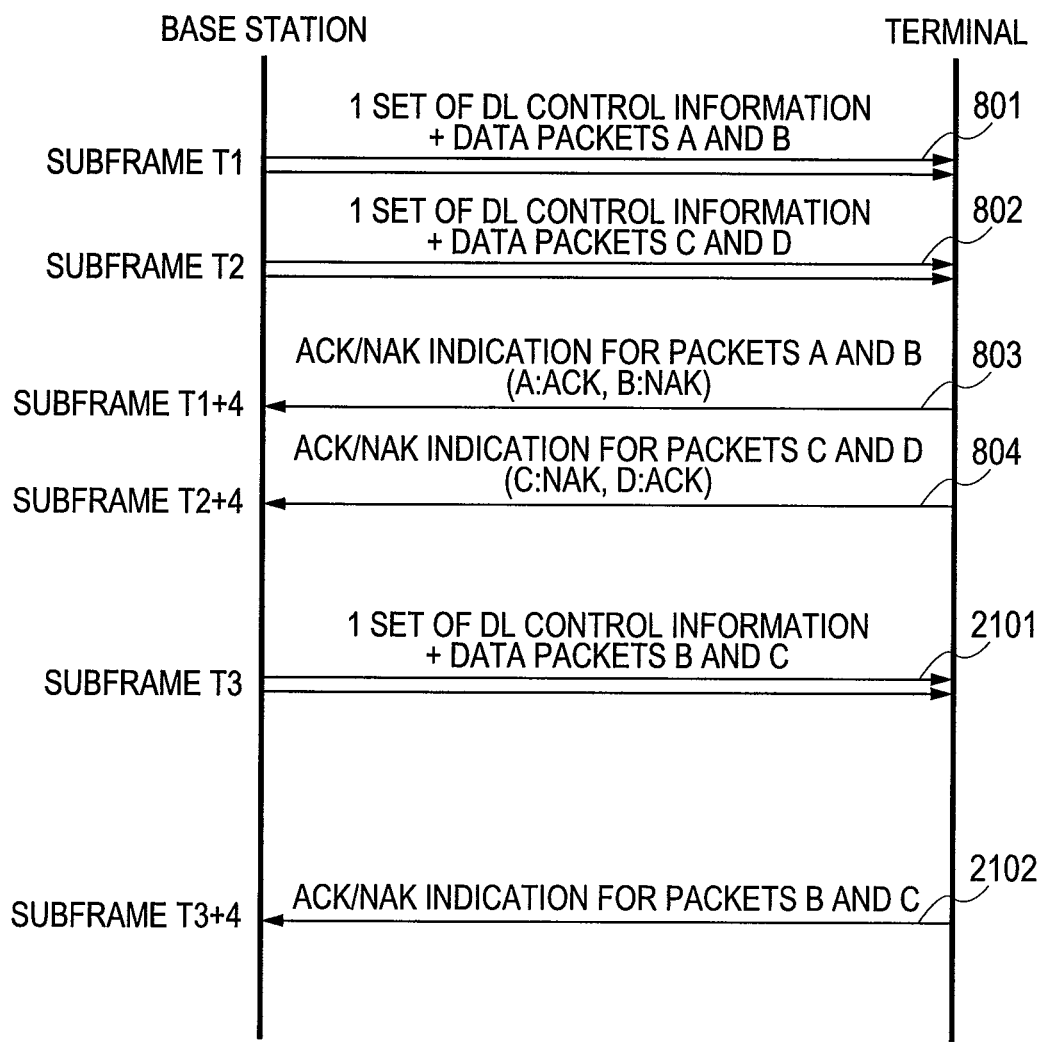
FIG. 21 shows a sequence of transmitting downlink data packets in two HARQ processes according to a second embodiment of the invention.

FIG. 21 shows a sequence of transmitting downlink data packets in two HARQ processes.

FIG. 21 differs from FIG. 8 in the contents of the sequences at Steps 803 and 804 for transmitting the ACK/NAK indication so that one of two data packets transmitted by using MCW-MIMO is ACK'ed and the other is NAK'ed.

Let us suppose the following case; along with downlink control information shown in FIG. 21, data packets A and B are transmitted by using MCW-MIMO in a HARQ process and data packets C and D are transmitted by using MCW-MIMO in another HARQ process, and that data packets A and D are ACK'ed and data packets B and C are NAK'ed.

In this case, the base station 201 retransmits data packets B and C to the terminal 202 using MCW-MIMO at subframe T3 after completion of Steps 803 and 804.

At the same time, base station 201 transmits one set of downlink control information containing information needed for decoding data packets B and C to the terminal 202 (Step 2101). That is, the base station 201 transmits the data packets and one set of downlink control information at Step 2101.

At Step 2101, the process is assumed to transmit data packet B in the second layer and transmit data packet C in the first layer.

FIG. 22 exemplifies downlink control information transmitted at Step 2101.

In FIG. 22, Swap is set to 0. NDI for the first data packet is set to 1. Process ID for the first data packet is set to P2. The MCS number and RV for the first data packet correspond to those applied to data packet C. NDI for the second data packet is set to 1. Process ID for the second data packet is set to P1. The MCS number and RV for the second data packet correspond to those applied to data packet B.

FIG. 22 differs from FIG. 10 in that process ID is specified for each of the two data packets.

The terminal 202 receives the data packets and the downlink control information at Step 2101 and then transmits the ACK/NAK indication to the base station 201 at subframe T3+4 (Step 2102).

At Step 2102, the terminal 202 transmits only one of a 2-bit ACK/NAK indication indicating the result of decoding the two data packets.

The 2-bit ACK/NAK indication represents the ACK or NAK state of the relevant data packet using the bit corresponding to the packet number in the downlink control information received by the terminal 201 at Step 2101.

2. Apparatus Configuration and Operation Flows

With reference to FIGS. 23 through 26, the following describes operational flowcharts of the base station apparatus 201 and the terminal 202 for performing the above-mentioned operations according to the embodiment.

The configuration of the base station apparatus 201 is the same as that shown in FIG. 13. The operational flowchart of the scheduler 1331 in the base station apparatus 201 is the same as that shown in FIG. 14. However, the operation of downlink control information generation process at Step 1407 differs from the equivalent in FIG. 16.

Figure 23:
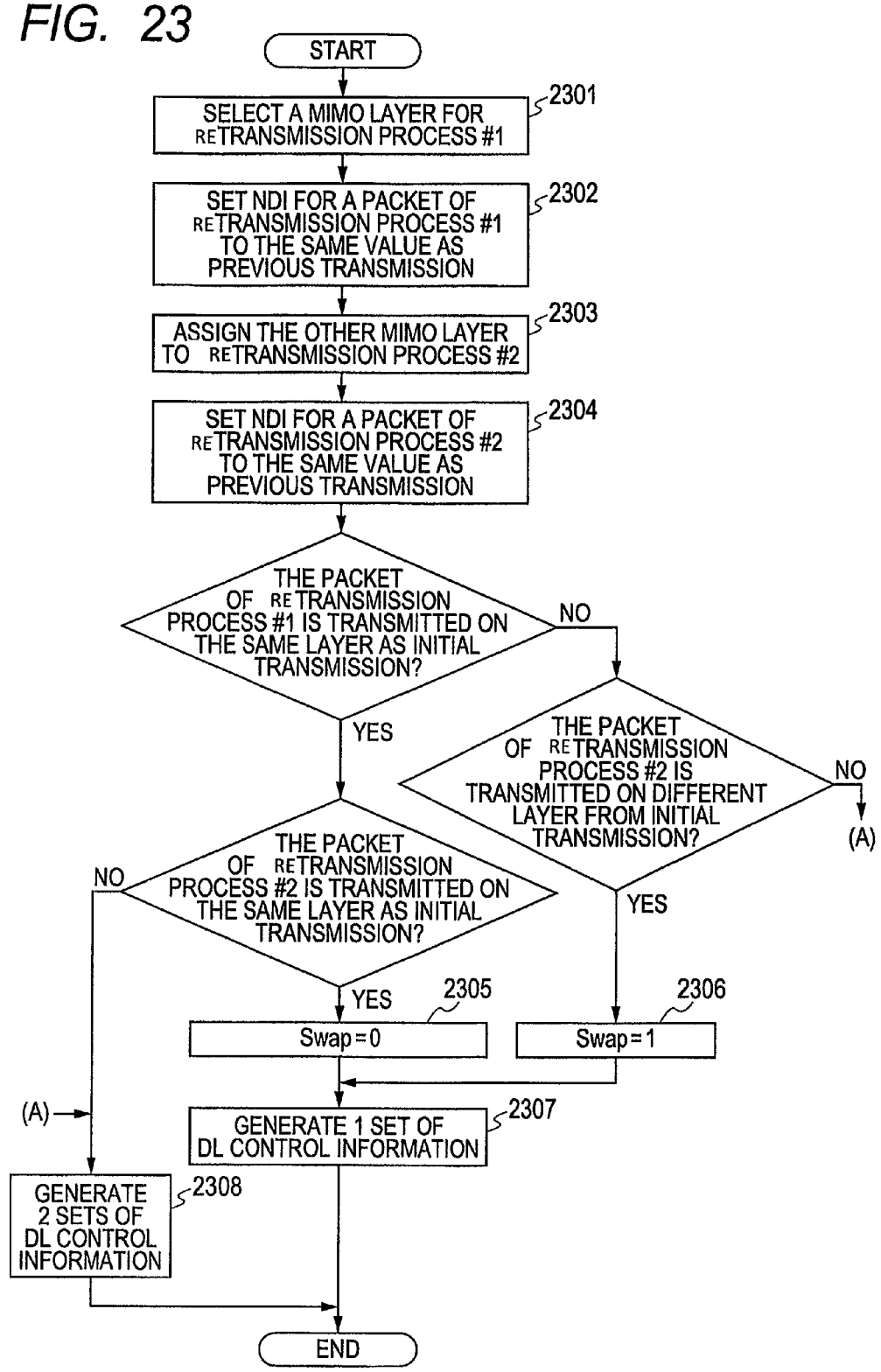
FIG. 23 is a detailed operational flowchart showing a downlink control information generation process of a scheduler for the base station apparatus according to the second embodiment of the invention.

FIG. 23 shows an operational flowchart of the downlink control information generation process for the scheduler 1331 at Step 1407.

The scheduler 1331 selects a layer used for retransmission of data packets in the first retransmission process (Step 2301). The scheduler 1331 sets the NDI for the packet number of the relevant data packet to the same value as the previous transmission (Step 2302).

The scheduler 1331 defines the layer not selected at Step 2301 for retransmission in the first retransmission process as a layer used for data packet retransmission in the second retransmission process (Step 2303). The scheduler 1331 sets the NDI for the packet number of the relevant data packet to the same value as the previous transmission (Step 2304).

The layers selected at Steps 2301 and 2303 may be the same as the layer used for initially transmitting the data packet. In this case, the scheduler 1331 sets the Swap value to 0 (Step 2305).

The layers selected at Steps 2301 and 2303 may differ from the layer used for initially transmitting the data packet. In this case, the scheduler 1331 sets the Swap value to 1 (Step 2306).

When either of Steps 2305 and 2306 is completed, one set of downlink control information is generated using Swap set at these steps and the values of RB index, Process ID, MCS, RV, and PMI decided at Steps 1402, 1403, 1404, and 1405 (Step 2307).

The layers decided at Steps 2301 and 2303 may differ from the layer used for initially transmitting one of data packets retransmitted in the first and second retransmission processes and may equal the layer used for initially transmitting the other data packet. In such case, the embodiment is inapplicable and the scheduler 1331 generates two pieces of control information similarly to the first embodiment (Step 2308).

The configuration of the terminal 202 is the same as that shown in FIG. 17. However, operations of the downlink control channel reception unit 1721, the downlink shared channel reception unit 1722, and the ACK/NAK judgment unit 1732 differ from those of the first embodiment.

Figure 24:
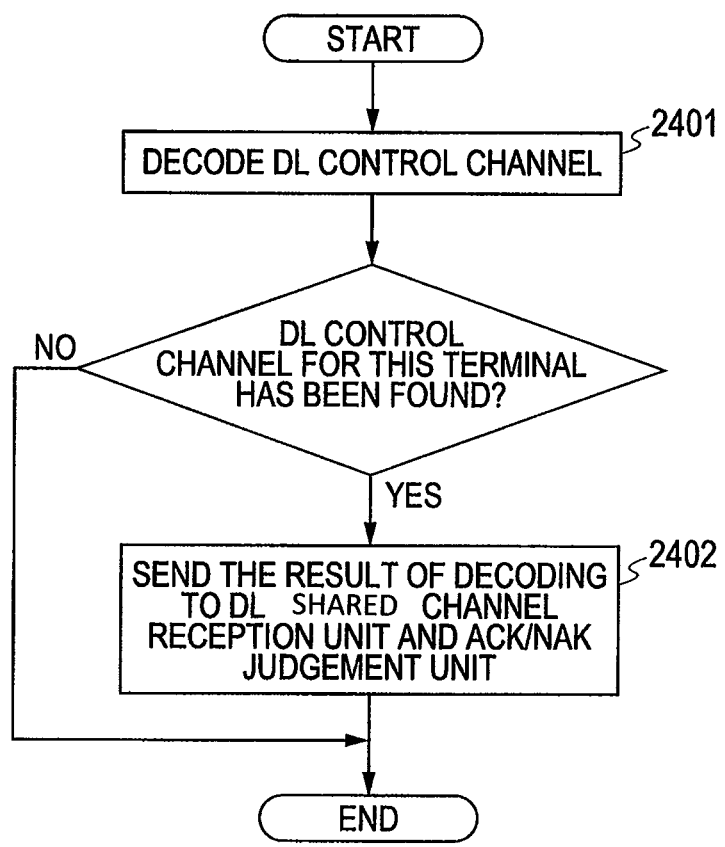
FIG. 24 is an operational flowchart of a downlink control channel reception unit in a terminal unit according to the second embodiment of the invention.

FIG. 24 shows an operational flowchart of the downlink control channel reception unit 1721 at each subframe. When a new subframe is initiated, the downlink control channel reception unit 1721 attempts to decode a downlink control channel (Step 2401).

When a successfully decoded downlink control channel is available, the downlink control channel reception unit 1721 decides that the decoded information is equivalent to the downlink control information addressed to the terminal. The downlink control channel reception unit 1721 notifies the content to the downlink shared channel reception unit 1722 and the ACK/NAK judgment unit 1732 (Step 2402) and terminates the process.

When a successfully decoded downlink control channel is unavailable as a result of Step 2401, the downlink control channel reception unit 1721 decides unavailability of downlink control information addressed to the terminal and terminates the process.

Figure 25:
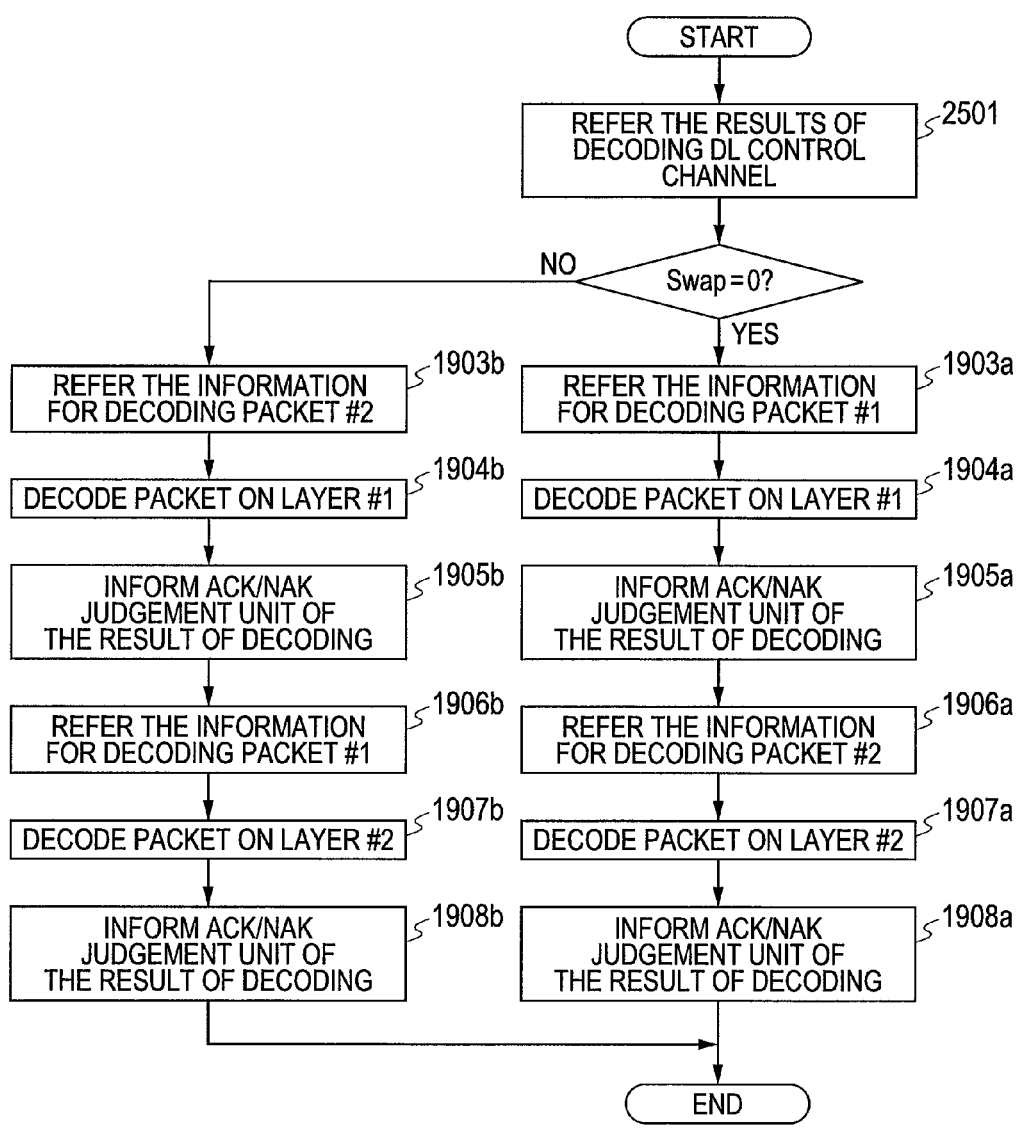
FIG. 25 is an operational flowchart of a downlink shared channel reception unit in the terminal unit according to the second embodiment of the invention.

FIG. 25 shows an operational flowchart of the downlink shared channel reception unit 1722 when the downlink control channel reception unit notifies a result of decoding the downlink control channel at Step 2402. When a new subframe is initiated, the downlink shared channel reception unit 1722 references the result of decoding the downlink control channel notified at Step 2402 (Step 2501).

The subsequent operations up to the completion of Step 1908a or 1908b are the same as those in FIG. 19.

When Step 1908a or 1908b is complete, the downlink shared channel reception unit 1722 terminates the process.

Figure 26:
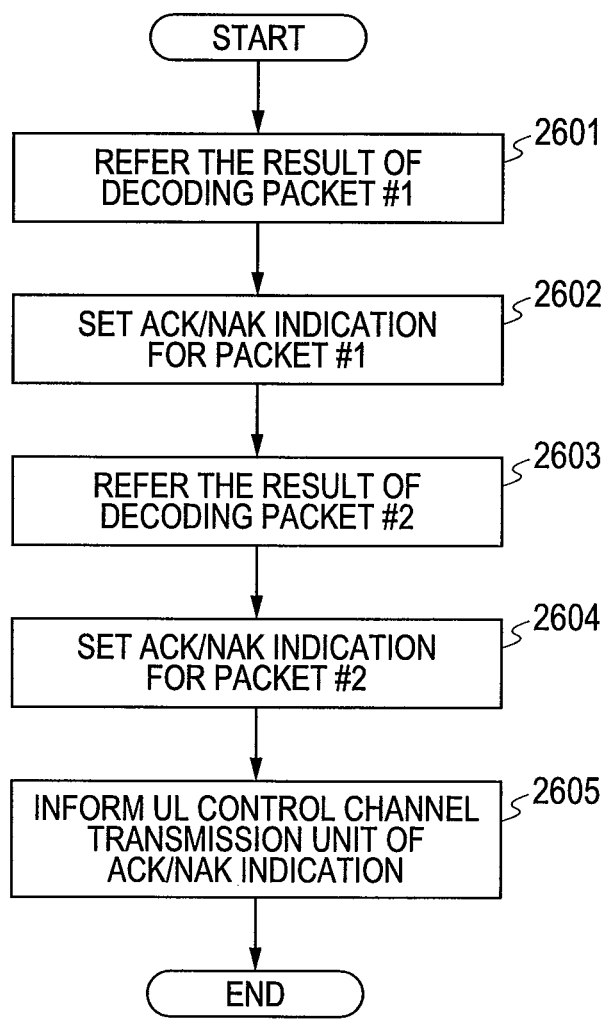
FIG. 26 is an operational flowchart of an ACK/NAK judgment unit in the terminal unit according to the second embodiment of the invention.

FIG. 26 shows an operational flowchart of the ACK/NAK judgment unit 1732.

The ACK/NAK judgment unit 1732 references the result of decoding the first data packet notified from the downlink shared channel reception unit 1722 (Step 2601). The ACK/NAK judgment unit 1732 assigns 1 as successful decoding or 0 as unsuccessful decoding to the bit representing the first data packet information in the ACK/NAK indication (Step 2602).

The ACK/NAK judgment unit 1732 references the result of decoding the second data packet notified from the downlink shared channel reception unit 1722 (Step 2603). The ACK/NAK judgment unit 1732 assigns 1 as successful decoding or 0 as unsuccessful decoding to the bit representing the second data packet information in the ACK/NAK indication (Step 2604) and terminates the process.

Compared to the first embodiment, the second embodiment just uses one set of downlink control information transmitted from the base station to the terminal even when multiple HARQ retransmission processes are consolidated into one MCW-MIMO transmission operation. The embodiment can decrease an overhead due to transmission of the control information. The embodiment is not limited to MCW-MIMO, SISO, and SCW-MIMO as the transmission techniques and HARQ as the retransmission technique as long as two or more retransmission processes are used.

C. Third Embodiment

The third embodiment of the invention will be described with reference to FIGS. 27 through 30.

The third embodiment equals the first embodiment in terms of the overall configuration including the base station apparatus 201, the terminal 202, and the network 203, and their internal hardware configuration shown in FIG. 1. The third embodiment differs from the first embodiment in operations of the base station apparatus 201 and information exchanged between the base station apparatus 201 and the terminal 202.

1. Downlink Control Information and Transmission Sequence

Figure 27:
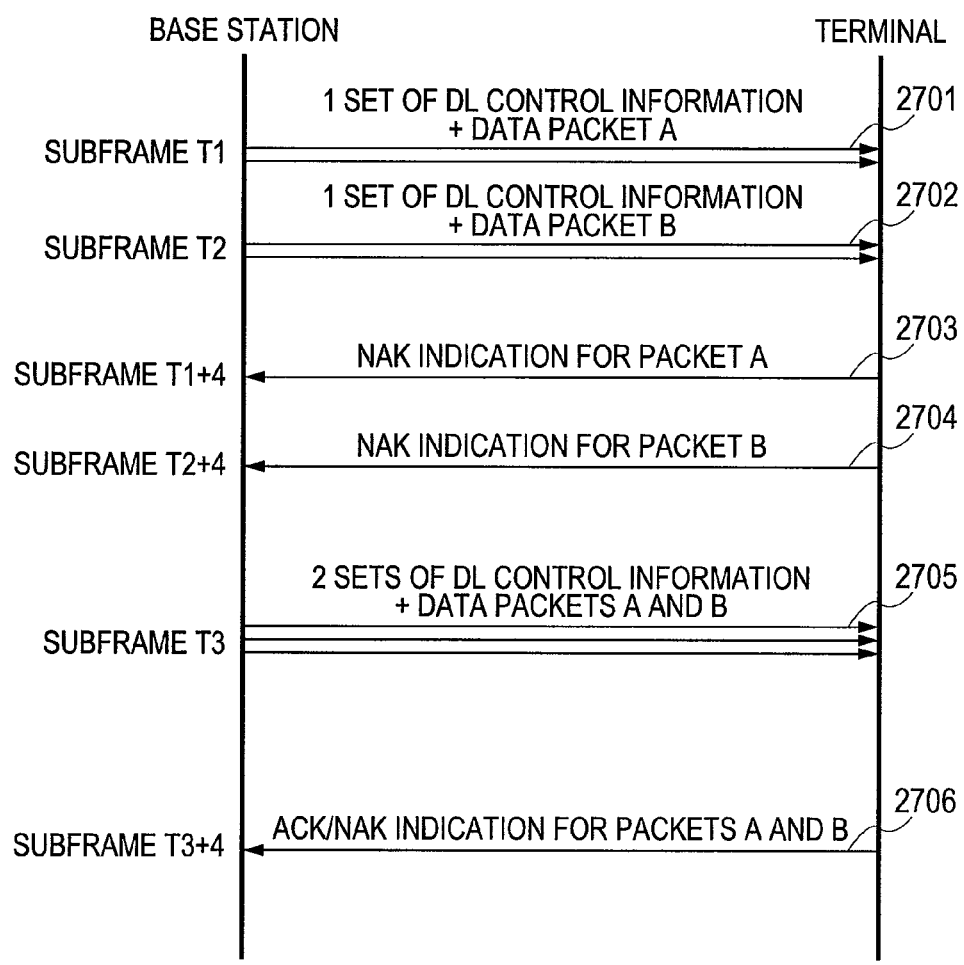
FIG. 27 shows a sequence of transmitting downlink data packets in two HARQ processes according to a third embodiment of the invention.

FIG. 27 shows a sequence of transmitting downlink data packets in two HARQ processes.

In HARQ process P1, the base station 201 transmits data packet A to the terminal 202 at subframe T1. At the same time, the base station 201 transmits one set of downlink control information containing information needed for decoding data packet A to the terminal 202 (Step 2701).

The terminal 202 receives the data packet and the downlink control information at Step 2701 and then transmits the ACK/NAK indication to the base station 201 at subframe T1+4 (Step 2703).

In HARQ process P2, the base station 201 transmits data packet B to the terminal 202 at subframe T2 different from subframe T1. At the same time, the base station 201 transmits one set of downlink control information containing information needed for decoding data packet B to the terminal 202 (Step 2702).

The terminal 202 receives the data packet and the downlink control information at Step 2702 and then transmits the ACK/NAK indication to the base station 201 at subframe T2+4 (Step 2704).

FIG. 28 (28A and 28B) exemplifies downlink control information transmitted at Steps 2701 and 2702.

FIG. 28A shows the downlink control information transmitted at Step 2701. Process ID is set to P1. NDI is set to 1. The MCS number and RV correspond to those applied to data packet A.

FIG. 28B shows the downlink control information transmitted at Step 2702. Process ID is set to P2. NDI is set to 1. The MCS number and RV correspond to those applied to data packet B.

The resource allocation in FIGS. 28A and 28B may or may not use the same values.

When the contents of the ACK/NAK indication transmitted at Steps 2703 and 2704 are both NAK'ed, the base station 201 retransmits data packets A and B to the terminal 202 using MCW-MIMO at subframe T3 after completion of Steps 2703 and 2704.

At the same time, the base station 201 transmits downlink control information containing information needed for decoding data packet A and downlink control information containing information needed for decoding data packet B to the terminal 202 (Step 2705). That is, the base station 201 transmits the data packets and two pieces of downlink control information at Step 2705.

At Step 2705, the process is assumed to transmit data packet A in the first layer and transmit data packet B in the second layer.

FIGS. 29A and 29B exemplify two pieces of downlink control information transmitted at Step 2705.

In FIG. 29A, Process ID is set to P1. Swap is set to 1. NDI for the first data packet is set to 1. The MCS number and RV for the first data packet correspond to those applied to data packet A. NDI for the second data packet is set to 0. The MCS number and RV for the second data packet are assigned dummy values.

In FIG. 29B, Process ID is set to P2. Swap is set to 0. NDI for the first data packet is set to 0. NDI for the second data packet is set to 1. The MCS number for the second data packet corresponds to that applied to data packet B. The MCS number and RV for the first data packet are assigned dummy values.

The resource allocation and PMI in FIGS. 29A and 29B use the same values.

The terminal 202 receives the data packets and the downlink control information at Step 2705 and then transmits the ACK/NAK indication to the base station 201 at subframe T3+4 (Step 2706).

At Step 2706, the terminal 202 transmits only one of a 2-bit ACK/NAK indication indicating the result of decoding the two data packets.

The rule of generating the 2-bit ACK/NAK indication differs from Step 806 in the first embodiment. The terminal references two pieces of downlink control information, decodes the first and second data packets, and directly assigns the decoding results to the corresponding bits.

2. Apparatus Configuration and Operation Flows

The third embodiment equals the first embodiment with respect to the configurations of the base station apparatus 201 and the terminal 202 in order to perform the operations described in FIGS. 27 through 29.

The third embodiment equals the first embodiment with respect to the operational flowcharts for the constituent components except the downlink control information generation process of the scheduler 1331 in the base station apparatus 201 and operations of the ACK/NAK judgment unit 1732 in the terminal 202.

Figure 30:
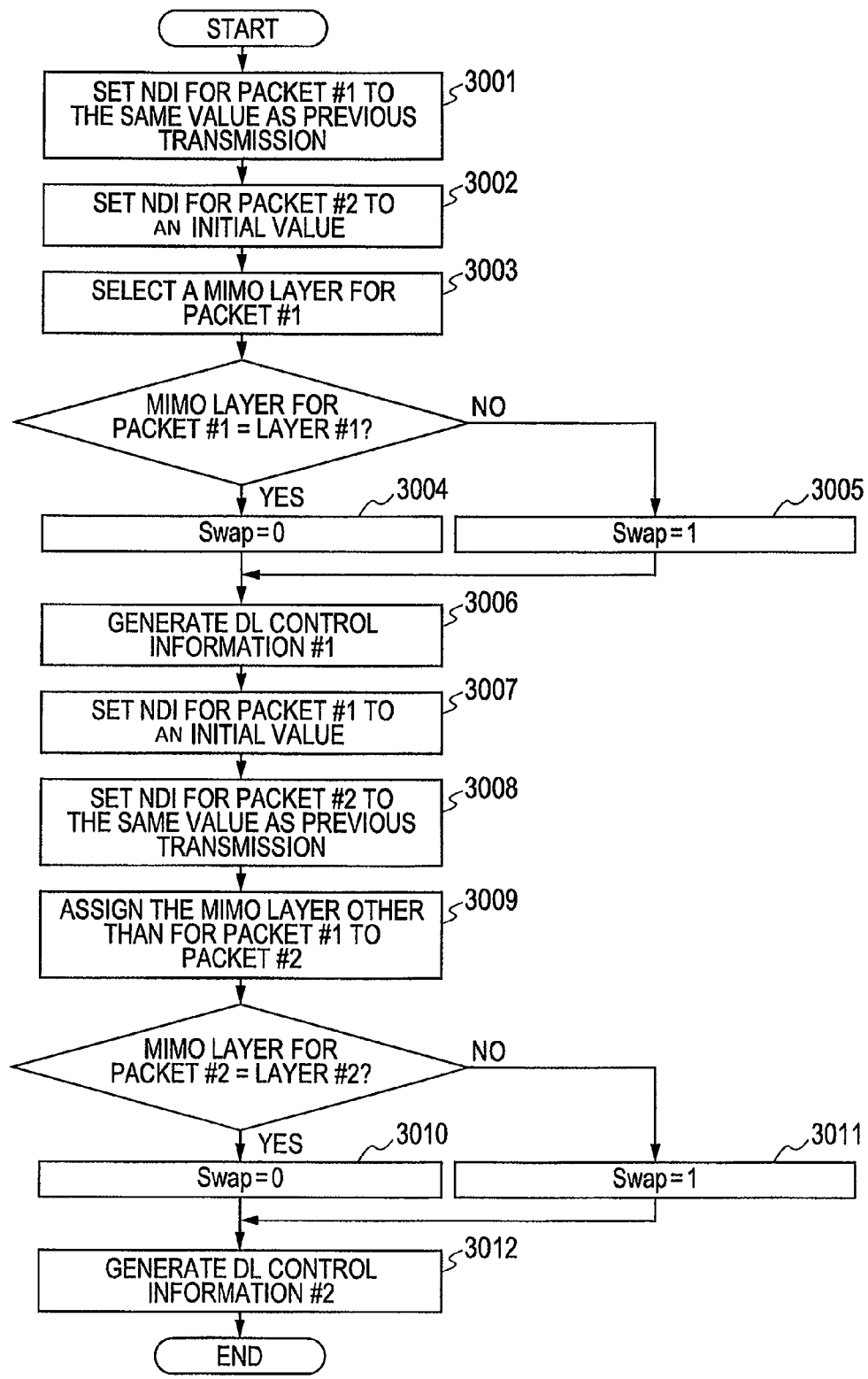
FIG. 30 is a detailed operational flowchart showing a downlink control information generation process of the base station apparatus according to the third embodiment of the invention.

FIG. 30 shows an operational flowchart of the downlink control information generation process for the scheduler 1331 of the base station apparatus 201.

The scheduler 1331 assumes a retransmission packet in the first retransmission process to be a first data packet and a retransmission packet in the second retransmission process to be a second data packet.

The scheduler 1331 sets NDI of the first data packet to the same value as for the previous transmission and NDI of the second data packet to an initial value (1 or 0) (Steps 3001 and 3002). The scheduler 1331 then decides a layer used for the retransmission (Step 3003).

When the first layer is decided at Step 3003, the scheduler 1331 sets the Swap value to 0 (Step 3004). Otherwise, the scheduler 1331 sets the Swap value to 1 (Step 3005).

The scheduler 1331 generates the first downlink control information using the NDI and Swap values settled so far and the values decided at Steps 1402, 1403, 1404, and 1405 (Step 3006).

The scheduler 1331 sets NDI of the first data packet to an initial value (1 or 0) and NDI of the second data packet to the same value as for the previous transmission (Steps 3007 and 3008). The scheduler 1331 defines the layer not selected at Step 3003 for retransmission of the first data packet as a layer used for retransmission of the second data packet (Step 3009).

When the second layer is decided at Step 3009, the scheduler 1331 sets the Swap value to 0 (Step 3010). Otherwise, the scheduler 1331 sets the Swap value to 1 (Step 3011).

The scheduler 1331 generates the second downlink control information using the NDI and Swap values settled so far and the values decided at Steps 1402, 1403, 1404, and 1405 (Step 3012).

Operational flowcharts for the terminal 202 and the ACK/NAK judgment unit 1732 are the same as those in the first embodiment (see FIG. 20 and its description).

When the HARQ processes transmit one data packet, the embodiment can consolidate the retransmission operations into one MCW-MIMO transmission operation. The embodiment can approximately halve the amount of time-related resource needed to retransmit packets transmitted by SISO or MCW-MIMO and improve the usage efficiency of resources. The embodiment is not limited to MCW-MIMO, SISO, and SCW-MIMO as the transmission techniques and HARQ as the retransmission technique as long as two or more retransmission processes are used.

D. Fourth Embodiment

The fourth embodiment of the invention will described with reference to FIGS. 31 through 34.

The fourth embodiment equals the first embodiment in terms of the overall configuration including the base station apparatus 201, the terminal 202, and the network 203, and their internal hardware configuration shown in FIG. 1. The fourth embodiment differs from the first embodiment in operations of the base station apparatus 201 and information exchanged between the base station apparatus 201 and the terminal 202.

Figure 32:
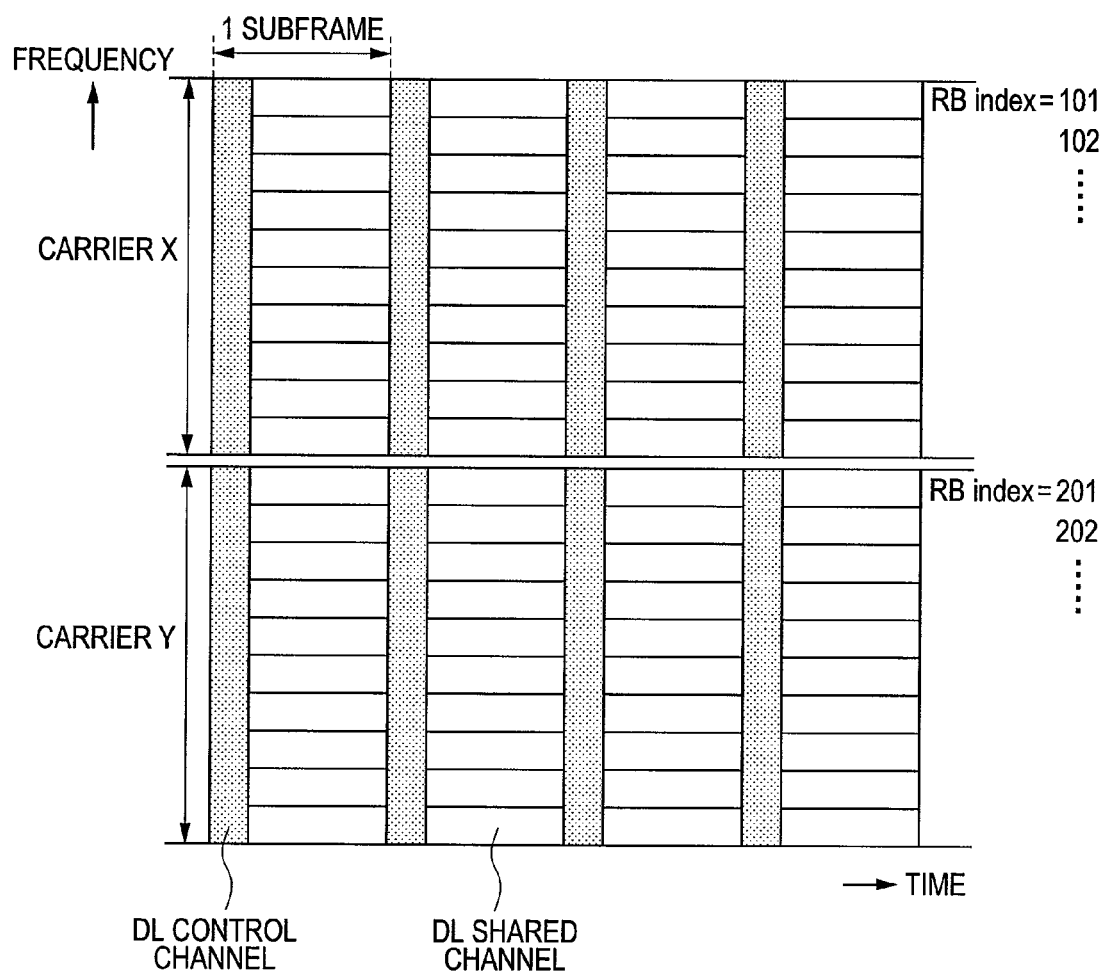
FIG. 32 is a configuration diagram showing a physical channel for a wireless interval according to the fourth embodiment of the invention.

FIG. 32 shows a physical channel for a wireless interval according to the fourth embodiment.

The embodiment uses carriers X and Y with different frequencies, transmits the carriers using the same scheme as LTE, and provides an effect equivalent to doubling the LTE system band. While the embodiment concerns a double system band using two carriers, the embodiment is obviously applicable to triple or more system bands.

Resource blocks for carrier X are provided with identification numbers such as 101, 102, and so on. Resource blocks for carrier Y are provided with identification numbers such as 201, 202, and so on.

The two carriers need not necessarily belong to the same frequency. For example, one carrier may use the 800 MHz band and the other may use the 2 GHz band. In such a case, however, the RF signal processor 1310 of the base station apparatus 201 needs to be compatible with both frequency bands.

Let us consider that the base station apparatus 201 multiplexes and transmits packets A and B using carrier X and packets C and D using carrier Y in FIG. 32 based on MIMO. An HARQ process ID used by carrier X for transmitting packets and an HARQ process ID used by carrier Y for transmitting packets need to be configured so that they do not overlap with each other.

For example, the base station 201 assigns HARQ process P1 used for transmitting packets A and B. The base station 201 assigns HARQ process P2, different from P1, used for transmitting packets C and D.

Figure 33:
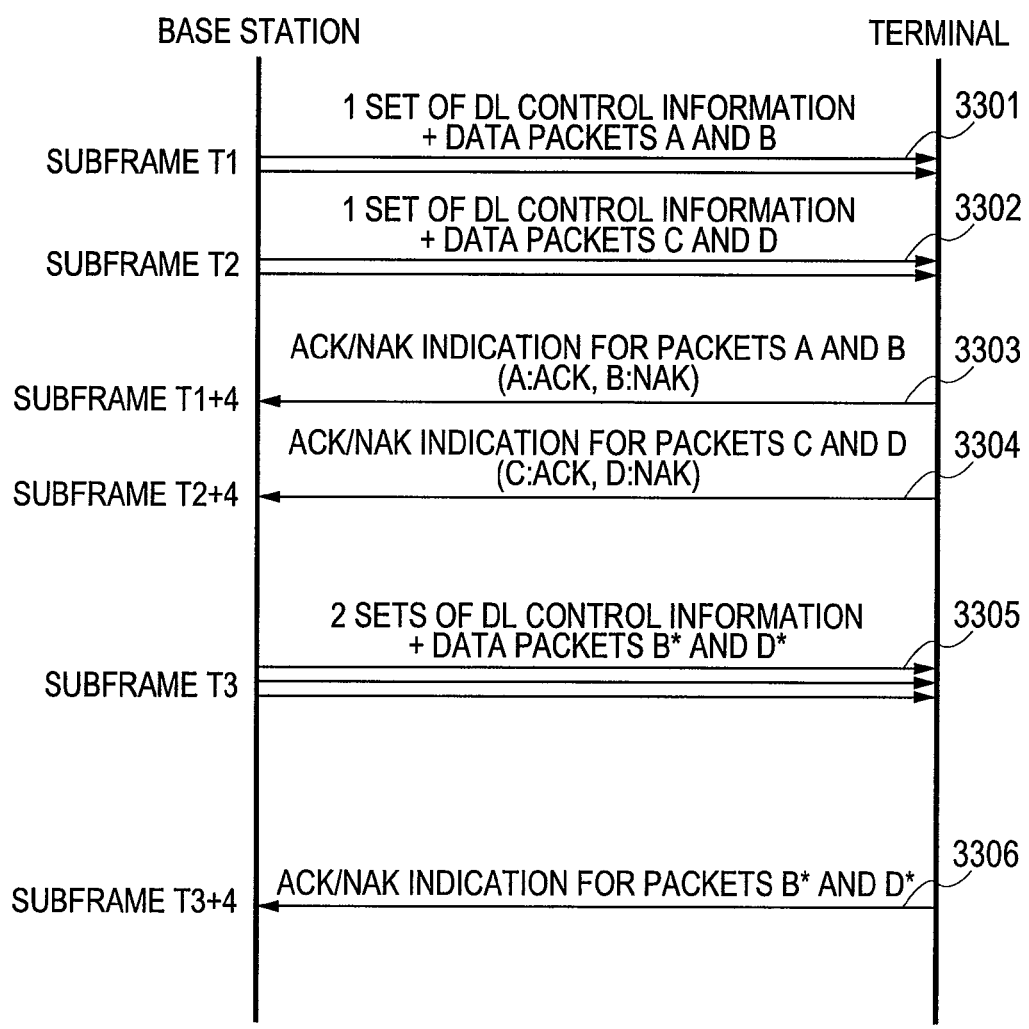
FIG. 33 shows a sequence of transmitting downlink data packets in two HARQ processes according to the fourth embodiment of the invention.

FIG. 33 shows a sequence of transmitting downlink data packets in two HARQ processes.

Steps 3301 through 3304 in FIG. 33 correspond to Steps 801 through 804 in FIG. 8, respectively.

FIG. 34 (34A and 34B) exemplifies downlink control information transmitted at Steps 3301 and 3302.

FIG. 34A shows the downlink control information transmitted at Step 3301. The resource block is set to 101. Process ID is set to P1. Swap is set to 0. NDI for the first data packet is set to 1. The MCS number and RV for the first data packet correspond to those applied to data packet A. NDI for the second data packet is set to 1. The MCS number and RV for the second data packet correspond to those applied to data packet B.

FIG. 34B shows the downlink control information transmitted at Step 3302. The resource block is set to 201. Process ID is set to P2. Swap is set to 0. NDI for the first data packet is set to 1. The MCS number and RV for the first data packet correspond to those applied to data packet C. NDI for the second data packet is set to 1. The MCS number and RV for the second data packet correspond to those applied to data packet D.

Let us suppose that data packets A and C are ACK'ed and B and D are NAK'ed at Steps 3303 and 3304.

In this case, the base station 201 multiplexes and transmits data packets B and D based on MCW-MIMO at Step 3305. At the same time, the base station 201 transmits downlink control information containing information needed for decoding data packet B and another downlink control information containing information needed for decoding data packet D to the terminal 202.

At Step 3305, it is assumed to use carrier X for transmitting data packet B in the first layer and transmitting data packet D in the second layer.

FIG. 31 (31A and 31B) exemplifies two pieces of downlink control information transmitted at Step 3305.

In FIG. 31A, the resource block is set to 101. Process ID is set to P1. Swap is set to 1. NDI for the first data packet is set to 0. NDI for the second data packet is set to 1. The MCS number and RV for the second data packet correspond to those applied to data packet B. The MCS number and RV for the first data packet are assigned dummy values.

In FIG. 31B, the resource block is set to 101. Process ID is set to P2. Swap is set to 0. NDI for the first data packet is set to 0. NDI for the second data packet is set to 1. The MCS number and RV for the second data packet correspond to that applied to data packet D. The MCS number and RV for the first data packet are assigned dummy values.

The terminal 202 receives the data packets and the downlink control information at Step 3305 and then transmits the ACK/NAK indication to the base station 201 at subframe T3+4 (Step 3306).

The same rule as described at Step 806 is used to generate the ACK/NAK indication transmitted at Step 3306.

To perform the above-mentioned operations, the base station apparatus 201 and the terminal 202 follow the same operational flowcharts as those described with reference to FIGS. 14 through 20 in the first embodiment.

The embodiment is applicable to a system using multiple carriers and is capable of improving the usage efficiency of frequencies by mutually multiplexing data transmitted over the different carriers. The embodiment is applicable to not only LTE systems but also other systems using multiple carriers.

The present invention is not limited to MCW-MIMO, and HARQ, and is also applicable to various transmission and/or retransmission techniques. Additionally, the present invention is not limited to LTE standards and is also applicable to other communication systems such as LTE-Advanced standards and WiMAX standards, for example.

What is claimed is:

1. A base station that multiplexes and retransmits a plurality of independently retransmitted downlink data packets to an identical terminal and transmits one or more pieces of downlink control information for decoding the retransmitted downlink data packets to the same terminal,
   (1) wherein the base station, at subframe T1 in process P1, transmits data packet A as a first data packet using one of a first layer and a first channel and data packet B as a second data packet using one of a second layer and a second channel,
   provides downlink control information with process ID P1 as an identification number of a process associated with a relevant data packet, decoding information for a first data packet as decoding information applied to data packet A, and decoding information for a second data packet as decoding information applied to data packet B, and
   transmits one set of downlink control information containing information needed for decoding data packets A and B at the subframe T1;
   (2) wherein the base station, at subframe T2 different from subframe T1, transmits data packet C as a first data packet using one of a first layer and a first channel and data packet D as a second data packet using one of a second layer and a second channel,
   provides downlink control information with process ID P2, decoding information for a first data packet as decoding information applied to data packet C, and decoding information for a second data packet as decoding information applied to data packet D, and
   transmits one set of downlink control information containing information needed for decoding data packets C and D at the subframe T2; and
   (3) wherein, when one of data packets A and B is NAK'ed and one of data packets C and D is NAK'ed according to ACK/NAK indication received from the terminal, the base station retransmits NAK'ed data packets at subframe T3 to the terminal,
   selects one of a layer and a channel used for data packet re-transmission in process P1, assigns re-transmission to NDI for one of a layer number corresponding to the data packet and a packet number as identification information indicating one of initial transmission and re-transmission of the data packet, supplies decoding information applied to a data packet to be transmitted, assigns the value indicating initial transmission to NDI for one of the other layer number and packet number, and supplies decoding information and a dummy value to generate first downlink control information,
   defines one of a layer and a channel not selected for data packet re-transmission in process P1 as a layer used for data packet re-transmission in process P2, assigns the value indicating re-transmission to NDI for one of a layer number and a packet number corresponding to the data packet, supplies decoding information applied to a data packet to be transmitted, assigns the value indicating initial transmission to NDI for one of the other layer number and packet number, and supplies decoding information and a dummy value to generate second downlink control information, and
   retransmits the first downlink control information and the second downlink control information to the terminal at the subframe T3, each downlink control information containing information needed for decoding a data packet to be retransmitted.

2. The base station according to claim 1,
   wherein, when data packets A and C are ACK'ed and data packets B and D are NAK'ed according to ACK/NAK indication received from the terminal, the base station retransmits data packets B and D at subframe T3 to the terminal,
   provides the first downlink control information with process ID P1, NDI for a first data packet which has the value indicating initial transmission, decoding information for the first data packet which has a dummy value, NDI for a second data packet which has the value indicating re-transmission, and decoding information applied to data packet B defined as decoding information for the second data packet,
   provides the second downlink control information with process ID P2, NDI for a first data packet which has the value indicating initial transmission, decoding information for the first data packet which has a dummy value, NDI for a second data packet which has the value indicating re-transmission, and decoding information applied to data packet D defined as decoding information for the second data packet, and
   transmits the first downlink control information containing information needed for decoding data packet B and the second downlink control information containing information needed for decoding data packet D at subframe T3 to the terminal.

3. The base station according to claim 1,
   wherein, when two or more re-transmission packets are available, the base station checks for availability of another re-transmission packet multiplexed during previous transmission of a first prioritized re-transmission packet, selects two of such re-transmission packets when available, otherwise checks for availability of another re-transmission packet multiplexed during previous transmission of a second prioritized re-transmission packet, selects only one first prioritized re-transmission packet in case of availability of such another re-transmission packet, and otherwise selects one first prioritized re-transmission packet and one second prioritized re-transmission packet.

4. The base station according to claim 1,
wherein decoding information in the downlink control information includes:
MCS (Modulation and Coding Scheme) representing an MCS number applied to a data packet; and
RV (Redundancy Version) representing which part of data to which error correcting coding is applied in the data packet is to be transmitted.

5. The base station according to claim 1,
wherein the downlink control information further includes:
resource allocation information representing the number of resource blocks assigned to a relevant downlink shared channel and a position in a frequency direction; and
PMI (Precoder Matrix Index) representing a precoding matrix number used in one of matrix operation and precoding for spatial multiplexing of a data packet.

6. A terminal that receives a re-transmission signal of a plurality of independently retransmitted and multiplexed downlink data packets from an identical base station and receives a plurality of control signals for decoding the downlink data packets from the same base station, (1) wherein the base station, at subframe T1 in process P1, transmits data packet A as a first data packet using one of a first layer and a first channel and data packet B as a second data packet using one of a second layer and a second channel to the terminal, provides downlink control information with process ID P1 as an identification number of a process associated with a relevant data packet, NDI representing one of initial transmission and re-transmission for a first data packet which has the value indicating initial transmission, decoding information for a first data packet as decoding information applied to data packet A, NDI for a second data packet which has the value indicating initial transmission, and decoding information for a second data packet as decoding information applied to data packet B, and transmits one set of downlink control information containing information needed for decoding data packets A and B at the subframe T1 to the terminal;

(2) wherein the base station, at subframe T2 different from subframe T1, transmits data packet C as a first data packet using one of a first layer and a first channel and data packet D as a second data packet using one of a second layer and a second channel to the terminal, provides downlink control information with process ID P2, NDI for a first data packet which has the value indicating initial transmission, decoding information for a first data packet as decoding information applied to data packet C, NDI for a second data packet which has that value indicating initial transmission, and decoding information for a second data packet as decoding information applied to data packet D, and transmits one set of downlink control information containing information needed for decoding data packets C and D at the subframe T2 to the terminal; and (3) wherein, when one of data packets A and B is NAK'ed and one of data packets C and D is NAK'ed according to ACK/NAK indication received from the terminal, the base station retransmits NAK'ed data packets at subframe T3 to the terminal, selects one of a layer and a channel used for data packet re-transmission in process P1, assigns the value indicating re-transmission to NDI for one of a layer number corresponding to the data packet and a packet number as identification information indicating one of initial transmission and re-transmission of the data packet, supplies decoding information applied to a data packet to be transmitted, and assigns the value indicating initial transmission to NDI for one of the other layer number and packet number to generate first downlink control information, defines one of a layer and a channel not selected for data packet re-transmission in process P1 as a layer used for data packet re-transmission in process P2, assigns the value indicating re-transmission to NDI for one of a layer number and a packet number corresponding to the data packet, supplies decoding information applied to a data packet to be transmitted, and assigns the value indicating initial transmission to NDI for the other packet number to generate second downlink control information, and retransmits the first downlink control information and the second downlink control information to the terminal at the subframe T3, each downlink control information containing information needed for decoding a data packet to be retransmitted;

(4) wherein, when receiving the two pieces of downlink control information at subframe T3 in such cases as described above, the terminal enables one of two bits of ACK/NAK indication correspondingly to one of ACK and NAK for a re-transmission packet decoded with reference to received downlink control information transmitted from a downlink control channel having a smaller downlink control channel number, enables the other one of two bits of ACK/NAK indication correspondingly to one of ACK and NAK for a re-transmission packet decoded with reference to received downlink control information transmitted from the other downlink control channel, and transmits one set of ACK/NAK indication indicating a result of decoding two data packets at subframe T3'.

7. The terminal according to claim 6,
wherein, when receiving two pieces of downlink control information, the terminal assigns one of ACK and NAK for data packet B to a bit corresponding to a second data packet equivalent to data packet B decoded with reference to downlink control information having a small downlink control channel number and assigns one of ACK and NAK for data packet D to a bit corresponding to a remaining first data packet.

8. The terminal according to claim 6,
wherein, when receiving only one set of downlink control information, the terminal attempts to decode downlink control channels in the ascending order of downlink control channel numbers at subframe T3, references downlink control information contained in one decoded downlink control channel, decodes two data packets transmitted from a downlink shared channel, assigns one of ACK and NAK based on a decoding result to a bit corresponding to a packet number in 2-bit ACK/NAK indication of a data packet provided with correct decoding information, and always assigns NAK to a bit corresponding to a packet number in 2-bit ACK/NAK indication of a data packet provided with dummy decoding information.

9. The terminal according to claim 6,
wherein, when two pieces of downlink control information are available, the terminal references NDI for a first data packet in each of first downlink control information and second downlink control information and checks for correspondence between the first data packet and a re-transmission packet;
wherein, when the first data packet is a retransmitted packet, the terminal enables a bit of ACK/NAK indication representing information about the first data packet in accordance with a result of decoding the first data packet and references NDI for a second data packet; and
wherein, when the second data packet is a retransmitted packet, the terminal enables a bit of ACK/NAK indication representing information about the second data packet in accordance with a result of decoding the second data packet and transmits one set of ACK/NAK indication to the base station using an uplink control channel.

10. The terminal according to claim 6,
wherein, when one set of downlink control information is available, the terminal references NDI for a first data packet in the first downlink control information and checks for correspondence between the first data packet and a re-transmission packet;
wherein, when the first data packet is a retransmitted packet, the terminal enables a bit of ACK/NAK indication representing information about the first data packet in accordance with a result of decoding the first data packet and references NDI for a second data packet; and
wherein, when the second data packet is a retransmitted packet, the terminal enables a bit of ACK/NAK indication representing information about the second data packet in accordance with a result of decoding the second data packet, the result being notified from a downlink shared channel reception unit, and transmits one set of ACK/NAK indication to the base station using an uplink control channel.

11. The terminal according to claim 6,
wherein the terminal references a notified downlink control channel decoding result;
wherein, when the downlink control channel decoding result contains information indicating correspondence between a data packet number and one of a layer number and a channel number, the terminal references first data packet decoding information contained in the decoding result, decodes one of a first layer and a first channel for a relevant downlink shared channel,
references second data packet decoding information contained in the downlink control channel decoding result, decodes one of a second layer and a second channel for a relevant downlink shared channel; and
wherein, when the downlink control channel decoding result contains information indicating difference between a data packet number and one of a layer number and a channel number, the terminal references second data packet decoding information contained in the decoding result, decodes one of a first layer and a first channel for a relevant downlink shared channel,
references first data packet decoding information contained in the downlink control channel decoding result, and decodes one of a second layer and a second channel for a relevant downlink shared channel.

12. The base station that multiplexes and retransmits a plurality of independently retransmitted downlink data packets to an identical terminal and transmits one or more pieces of downlink control information for decoding the retransmitted downlink data packets to the same terminal,
(1) wherein the base station, at subframe T1 in process P1, transmits data packet A as a first data packet using one of a first layer and a first channel and data packet B as a second data packet using one of a second layer and a second channel to the terminal,
provides downlink control information with process ID P1 as an identification number of a process associated with a relevant data packet, none for Swap representing correspondence between a set of first and second data packets and a set of first and second layers, NDI representing one of initial transmission and re-transmission for a first data packet which has the value indicating initial transmission, decoding information for a first data packet as decoding information applied to data packet A, NDI for a second data packet which has the value indicating initial transmission, and decoding information for a second data packet as decoding information applied to data packet B, and
transmits one set of downlink control information containing information needed for decoding data packets A and B at the subframe T1 to the terminal;
(2) wherein the base station, at subframe T2 different from subframe T1, transmits data packet C as a first data packet using one of a first layer and a first channel and data packet D as a second data packet using one of a second layer and a second channel to the terminal,
provides downlink control information with process ID P2, NDI for a first data packet which has the value indicating initial transmission, decoding information for a first data packet as decoding information applied to data packet C, NDI for a second data packet which has the value indicating initial transmission, and decoding information for a second data packet as decoding information applied to data packet D, and
transmits one set of downlink control information containing information needed for decoding data packets C and D at the subframe T2 to the terminal; and
(3) wherein, when one of data packets A and B is NAK'ed and one of data packets C and D is NAK'ed according to ACK/NAK indication received from the terminal, the base station retransmits NAK'ed data packets at subframe T3 to the terminal using layers for transmission at subframes T1 and T2,
selects one of a layer and a channel used for retransmitting a data packet in a first re-transmission process, assigns the value indicating re-transmission to NDI for a packet number corresponding to the data packet, supplies decoding information applied to a data packet to be transmitted,
defines one of a layer and a channel not selected for data packet re-transmission in a first re-transmission process as one of a layer and a channel used for data packet re-transmission in a second re-transmission process, assigns the value indicating re-transmission to NDI for a packet number corresponding to the data packet, supplies decoding information applied to a data packet to be transmitted to generate one set of downlink control information, and retransmits one set of downlink control information to the terminal at the subframe T3, the downlink control information being needed for decoding each data packet to be retransmitted.

13. The base station according to claim 12,
wherein, when data packets A and D are ACK'ed and data packets B and C are NAK'ed according to ACK/NAK indication received from the terminal, the base station retransmits data packet B using one of a second layer and a second channel and data packet C using one of a first layer and a first channel at subframe T3 to the terminal,
provides downlink control information with none for Swap process ID P2 for a first data packet, NDI for a first data packet which has the value indicating re-transmission, decoding information applied to data packet C defined as decoding information for the first data packet, process ID P1 for a second data packet, NDI for a second data packet which has the value indicating re-transmission, and decoding information applied to data packet B defined as decoding information for the second data packet, and
transmits one set of downlink control information containing information needed for decoding data packets B and C to the terminal.

14. The base station according to claim 12,
wherein the base station generates two pieces of control information when one of the layer and the channel decided above differs from one of a layer and a channel used for initially transmitting one of data packets retransmitted in first and second re-transmission processes and equals one of a layer and a channel used for initially transmitting the other data packet.

15. A terminal that receives a re-transmission signal of a plurality of independently retransmitted and multiplexed downlink data packets from an identical base station and receives a plurality of control signals for decoding the downlink data packets from the same base station,
(1) wherein the base station, at subframe T1 in process P1, transmits data packet A as a first data packet using one of a first layer and a first channel and data packet B as a second data packet using one of a second layer and a second channel to the terminal, and
transmits one set of downlink control information containing information needed for decoding data packets A and B at the subframe T1 to the terminal;
(2) wherein the base station, at subframe T2 different from subframe T1, transmits data packet C as a first data packet using one of a first layer and a first channel and data packet D as a second data packet using one of a second layer and a second channel to the terminal,
transmits one set of downlink control information containing information needed for decoding data packets C and D at the subframe T2 to the terminal; and
(3) wherein, when one of data packets A and B is NAK'ed and one of data packets C and D is NAK'ed according to ACK/NAK indication received from the terminal, the base station retransmits NAK'ed data packets at subframe T3 to the terminal using layers for transmission at subframes T1 and T2,
selects one of a layer and a channel used for retransmitting a data packet in a first re-transmission process, assigns the value indicating re-transmission to NDI for a packet number corresponding to the data packet, supplies decoding information applied to a data packet to be transmitted,
defines one of a layer and a channel not selected for data packet re-transmission in a first re-transmission process as one of a layer and a channel used for data packet re-transmission in a second re-transmission process, assigns the value indicating re-transmission to NDI for a packet number corresponding to the data packet, supplies decoding information applied to a data packet to be transmitted to generate one set of downlink control information, and
retransmits one set of downlink control information to the terminal at the subframe T3, the downlink control information being needed for decoding each data packet to be retransmitted; and
(4) wherein, as a response to the downlink control information, the terminal enables a bit of ACK/NAK indication representing information about a first data packet in accordance with a result of decoding the first data packet, enables a bit of ACK/NAK indication representing information about a second data packet in accordance with a result of decoding the second data packet, and transmits one set of ACK/NAK indication to the base station using an uplink control channel.

* * * * *